(12) United States Patent
Humphries et al.

(10) Patent No.: US 11,861,747 B1
(45) Date of Patent: Jan. 2, 2024

(54) TIME ON MARKET AND LIKELIHOOD OF SALE PREDICTION

(71) Applicant: Zillow, Inc., Seattle, WA (US)

(72) Inventors: Stanley B. Humphries, Sammamish, WA (US); Dong Xiang, Sammamish, WA (US); Yeng Bun, Seattle, WA (US); Krishna Rao, Seattle, WA (US); Elisa Sheng, Seattle, WA (US); Chris Sipola, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 505 days.

(21) Appl. No.: 15/698,276

(22) Filed: Sep. 7, 2017

(51) Int. Cl.
*G06Q 50/16* (2012.01)
*G06Q 30/0201* (2023.01)
*G06N 20/00* (2019.01)

(52) U.S. Cl.
CPC ............. *G06Q 50/16* (2013.01); *G06N 20/00* (2019.01); *G06Q 30/0206* (2013.01)

(58) Field of Classification Search
CPC ....................................... G06Q 30/0207–0277
See application file for complete search history.

(56) References Cited

U.S. PATENT DOCUMENTS

| 5,855,011 | A | 12/1998 | Tatsuoka |
| 6,260,033 | B1 | 7/2001 | Tatsuoka |
| 6,301,571 | B1 | 10/2001 | Tatsuoka |
| 6,493,721 | B1 | 12/2002 | Getchius et al. |
| 6,618,715 | B1 | 9/2003 | Johnson et al. |
| 6,684,196 | B1 | 1/2004 | Mini et al. |
| 7,016,866 | B1 | 3/2006 | Chin et al. |
| 7,389,242 | B2 | 6/2008 | Frost |
| 7,636,687 | B2 | 12/2009 | Foster et al. |
| 7,827,128 | B1 | 1/2010 | Yan et al. |
| 7,818,219 | B2 | 10/2010 | Klivington |
| 7,962,353 | B1 | 6/2011 | Menzies |
| 8,015,091 | B1 | 9/2011 | Ellis |
| 8,140,421 | B1 * | 3/2012 | Humphries .......... G06Q 40/025 705/36 R |
| 8,234,205 | B1 | 7/2012 | Harrington |
| 8,386,395 | B1 | 2/2013 | Gordon et al. |
| 8,407,120 | B1 | 3/2013 | Gordon et al. |
| 8,433,512 | B1 | 4/2013 | Lopatenko |
| 8,688,461 | B1 | 4/2014 | Richards |
| 8,719,041 | B2 | 5/2014 | Verex |
| 10,984,489 | B1 * | 4/2021 | Bruce ................... G06N 20/00 |
| 2002/0052814 | A1 | 5/2002 | Ketterer |
| 2003/0055747 | A1 | 3/2003 | Carr et al. |

(Continued)

FOREIGN PATENT DOCUMENTS

| JP | 2003854023 | 3/2003 |
| WO | WO0041119 | 7/2000 |
| WO | WO2014137510 | 9/2014 |

OTHER PUBLICATIONS

Campbell, "Forced Sales and House Prices", 101 American Economic Review 2108, pp. 2108-2131, Aug. 2011.

(Continued)

*Primary Examiner* — Chrystina E Zelaskiewicz
(74) *Attorney, Agent, or Firm* — PERKINS COIE LLP

(57) ABSTRACT

A facility for estimating the value of a distinguished home, estimating the length of time a home or other property will be on the market at a listing price, and predicting the likelihood of sale of a home at a listing price is described.

32 Claims, 24 Drawing Sheets

(56) References Cited

U.S. PATENT DOCUMENTS

| | | |
|---|---|---|
| 2003/0115164 A1 | 6/2003 | Jeng |
| 2004/0059688 A1 | 3/2004 | Dominguez et al. |
| 2004/0093270 A1 | 5/2004 | Gilbert |
| 2004/0153663 A1 | 8/2004 | Clark et al. |
| 2004/0267657 A1 | 12/2004 | Hecht |
| 2005/0154664 A1 | 7/2005 | Guy et al. |
| 2005/0192930 A1 | 9/2005 | Hightower et al. |
| 2006/0287810 A1 | 12/2006 | Sadri et al. |
| 2007/0150353 A1 | 6/2007 | Krassner |
| 2007/0185727 A1* | 8/2007 | Ma ................... G06Q 30/0201 705/306 |
| 2007/0244780 A1 | 10/2007 | Liu |
| 2007/0265960 A1 | 11/2007 | Advani |
| 2008/0027857 A1 | 1/2008 | Benson |
| 2008/0086356 A1 | 4/2008 | Glassman et al. |
| 2008/0109409 A1 | 5/2008 | Hengel |
| 2008/0133319 A1 | 6/2008 | Adiga et al. |
| 2008/0183598 A1 | 7/2008 | Carr et al. |
| 2008/0312942 A1 | 12/2008 | Katta et al. |
| 2009/0037328 A1 | 2/2009 | Abuaf |
| 2009/0076902 A1 | 3/2009 | Grinsted et al. |
| 2009/0164383 A1* | 6/2009 | Rothman ............... G06Q 30/06 705/26.1 |
| 2009/0265285 A1 | 10/2009 | Balaishis |
| 2009/0287596 A1 | 11/2009 | Torrenegra |
| 2010/0023379 A1 | 1/2010 | Rappaport |
| 2010/0076881 A1 | 3/2010 | O'Grady |
| 2010/0161471 A1 | 6/2010 | Fendick |
| 2011/0047083 A1 | 2/2011 | Lawler |
| 2011/0066561 A1 | 3/2011 | Lazarre et al. |
| 2011/0071899 A1 | 3/2011 | Robertson et al. |
| 2011/0251974 A1* | 10/2011 | Woodard ............... G06Q 50/16 705/348 |
| 2011/0270779 A1 | 11/2011 | Showalter |
| 2012/0330719 A1 | 12/2012 | Malaviya et al. |
| 2013/0041841 A1 | 2/2013 | Lyons |
| 2013/0275252 A1 | 10/2013 | Martin et al. |
| 2013/0339255 A1 | 12/2013 | Talbird |
| 2013/0346151 A1* | 12/2013 | Bleakley .......... G06Q 10/06375 705/7.29 |
| 2014/0257924 A1 | 9/2014 | Xie |
| 2015/0006311 A1 | 1/2015 | Murugappan et al. |
| 2015/0006605 A1 | 1/2015 | Chu et al. |
| 2015/0012335 A1 | 1/2015 | Xie et al. |
| 2015/0066834 A1 | 3/2015 | Jeffries |
| 2015/0088766 A1 | 3/2015 | Krause |
| 2015/0242747 A1 | 8/2015 | Packes et al. |
| 2015/0269264 A1* | 9/2015 | Bolen ................. G06Q 30/0627 705/26.63 |
| 2016/0048934 A1 | 2/2016 | Gross |
| 2016/0171622 A1 | 6/2016 | Perkins et al. |
| 2016/0292763 A1* | 10/2016 | Goodrich ........... G06Q 30/0641 |
| 2016/0292800 A1* | 10/2016 | Smith ................... G06Q 50/16 |
| 2018/0232787 A1 | 8/2018 | Dupray |
| 2020/0334279 A1 | 10/2020 | Daimler et al. |
| 2020/0349176 A1 | 11/2020 | Daimler et al. |

OTHER PUBLICATIONS

Clauretie, "Estimating the House Foreclosure Discount Corrected for Spatial Price Interdependence and Endogeneity of Marketing Time", 37 Real Estate Economics 43, pp. 44-48, 2009.
Final Office Action for U.S. Appl. No. 14/041,450, dated Jun. 29, 2018, 14 pages.
Final Office Action for U.S. Appl. No. 14/704,567, dated May 1, 2018, 24 pages.
Final Office Action for U.S. Appl. No. 12/924,037, dated Jun. 7, 2018, 19 pages.
Final Office Action for U.S. Appl. No. 14/325,094, dated Jun. 5, 2018, 81 pages.
Final Office Action for U.S. Appl. No. 14/524,148, dated Jul. 19, 2018, 54 pages.
Final Office Action for U.S. Appl. No. 13/828,680, dated Jul. 11, 2018, 59 pages.
Final Office Action for U.S. Appl. No. 14/846,632, dated Jun. 11, 2018, 16 pages.
Humphries, S., "Foreclosure Liquidations Abate in the Fourth Quarter but at the Expense of Number of Homes Underwater," Zillow Research, Feb. 8, 2011, 3 pages.
Non-Final Office Action for U.S. Appl. No. 13/044,480, dated May 2, 2018, 51 pages.
Non-Final Office Action for U.S. Appl. No. 13/830,497, dated Apr. 12, 2018, 48 pages.
Notice of Allowance for U.S. Appl. No. 13/044,490, dated May 22, 2018, 8 pages.
Notice of Allowance for U.S. Appl. No. 14/167,962, dated Apr. 9, 2018, 11 pages.
Notice of Allowance for U.S. Appl. No. 14/167,962, dated May 14, 2018, 8 pages.
Roth, JD, "Is it Better to Rent or to Buy?" Time Business, Dec. 3, 2012, 2 pages.
Final Office Action for U.S. Appl. No. 14/709,719, dated Aug. 3, 2018, 27 pages.
Non-Final Office Action for U.S. Appl. No. 13/843,577, dated Aug. 30, 2018, 63 pages.
Final Office Action for U.S. Appl. No. 14/325,094, dated Jun. 7, 2019, 58 pages.
Final Office Action for U.S. Appl. No. 11/927,623, dated Jun. 14, 2019, 18 pages.
Non-Final Office Action for U.S. Appl. No. 14/704,567, dated Apr. 1, 2019, 29 pages.
Non-Final Office Action for U.S. Appl. No. 14/709,719, dated Jun. 3, 2019, 29 pages.
Notice of Allowance for U.S. Appl. No. 12/924,037, dated Apr. 24, 2019, 11 pages.
Final Office Action for U.S. Appl. No. 13/044,480, dated Dec. 14, 2018, 35 pages.
Non-Final Office Action for U.S. Appl. No. 14/325,094, dated Dec. 18, 2018, 95 pages.
Non-Final Office Action for U.S. Appl. No. 14/846,632, dated Dec. 26, 2018, 13 pages.
Non-Final Office Action for U.S. Appl. No. 14/041,450, dated Jan. 8, 2019, 23 pages.
Notice of Allowance for U.S. Appl. No. 13/044,490, dated Dec. 5, 2018, 6 pages.
Final Office Action for U.S. Appl. No. 14/721,437, dated Nov. 9, 2018, 84 pages.
Final Office Action for U.S. Appl. No. 14/640,860, dated Oct. 23, 2018, 85 pages.
Non-Final Office Action for U.S. Appl. No. 12/924,037, dated Nov. 7, 2018, 10 pages.
Readyratios.com, "Cost Approach to Value," https://www.readyratios.com/reference/appraisal/cost_approach_to_value.html, archived on Jul. 16, 2013, https://web.archive.org/web/20130716153950/https:www.readyratios.com/reference/appraisal/cost_approach_to_value.html, viewed Oct. 30, 2018, p. 1.
U.S. Appl. No. 16/665,426 for Humphries et al., filed Oct. 28, 2019.
Eamer, M., "ZipRealty and Redfin Integrate with Zillow's API," via the Wayback Machine as published on Oct. 23, 2006.
Final Office Action for U.S. Appl. No. 13/828,680, dated Jan. 3, 2020, 60 pages.
Final Office Action for U.S. Appl. No. 14/709,719, dated Dec. 2, 2019, 35 pages.
Gudell, Svenja, "One More Advance in Creating a Better Price-to-Rent Ratio", retrieved from the Internet, URL: https://www.zillow.com/research/one-more-advance-in-creating-a-better-price-to-rent-ratio-2968, Jul. 27, 2012, 4 pages.
Kottle, M.L., Zillow traffic up after shift; site known for real estate prices decided to add for-sale listings. San Francisco Chronicle.
Non-Final Office Action for U.S. Appl. No. 11/927,623, dated Nov. 5, 2019, 18 pages.
Non-Final Office Action for U.S. Appl. No. 14/325,094, dated Nov. 4, 2019, 58 pages.
Non-Final Office Action for U.S. Appl. No. 14/524, 48, dated Nov. 1, 2019, 44 pages.

(56) References Cited

OTHER PUBLICATIONS

Non-Final Office Action for U.S. Appl. No. 14/846,632, dated Nov. 29, 2019, 24 pages.
Non-Final Office Acton for U.S. Appl. No. 16/235,009, dated Jan. 24, 2020, 18 pages.
U.S. Appl. No. 16/178,457 for Martin et al., filed Nov. 1, 2018.
U.S. Appl. No. 16/449,210 for Flint et al., filed Jun. 21, 2019.
U.S. Appl. No. 16/457,390 for Shahbazi et al., filed Jun. 28, 2019.
Blelloch, G.E., "Prefix Sums and Their Applications," School of Computer Science, Carnegie Mellon University, 26 pages.
Final Office Action for U.S. Appl. No. 14/041,450, dated Sep. 24, 2019, 22 pages.
Final Office Action for U.S. Appl. No. 14/846,632, dated Aug. 6, 2019, 16 pages.
Manski, C et al., "Monotone Instrumental Variables: With an Application to the Returns to Schooling," Econometrica 68 (Jul. 2000) pp. 997-1010.
Non-Final Office Action for U.S. Appl. No. 13/828,680, dated Jul. 1, 2019, 63 pages.
Non-Final Office Action for U.S. Appl. No. 14/640,860, dated Sep. 6, 2019, 83 pages.
Non-Final Office Action for U.S. Appl. No. 14/721,437, dated Aug. 22, 2019, 84 pages.
Non-Final Office Action for U.S. Appl. No. 15/446,283, dated Oct. 10, 2019, 21 pages.
Non-Final Office Action for U.S. Appl. No. 15/439,388, dated Oct. 18, 2019, 76 pages.
Notice of Allowance for U.S. Appl. No. 13/044,480, dated Jun. 26, 2019, 17 pages.
Notice of Allowance for U.S. Appl. No. 14/704,567, dated Oct. 15, 2019, 17 pages.
Oladunni, T. et al., "Predictive Real Estate Multiple Listing System Using MVC Architecture and Linear Regression," ISCA 24th International Conference on Software Engineering and Data Engineering, 2015.
Oladunni, T. et al., "Hedonic Housing Theory—A Machine Learning Investigation," 2016.
Travis, M.R. et al., "ViewIt: computation of seen areas, slope, and aspect for land-use planning," Pacific Southwest Forest and Range Experiment Station, PWS—Nov. 1975, 11 pages.
Van Kreveld, M., "Variations on Sweep Algorithms: efficient computation of extended viewsheds and class intervals," Dept. of Computer Science, Utrecth University, 14 pages.
Wen, H.Z. et al., "An improved method of real estate evaluation based on Hedonic price model," IEEE International Engineering Management Conference, 2004.
Zurowski, B, "Essays in Social and Behavioral Economics," Retrieved from the University of Minnesota Digital Conservancy, http://hdl.handle.net/11299/175495, 2015.
De Floriani, L. et al., "Algorithms for visibility computation on terrains: a survey," Environment and Planning B: Planning and Design 2003, vol. 30, pp. 709-728.
Final Office Action for U.S. Appl. No. 14/846,632, dated May 7, 2020; 22 pages.
Final Office Action for U.S. Appl. No. 14/325,094, dated Apr. 22, 2020, 53 pages.
Final Office Action for U.S. Appl. No. 14/524,148, dated Mar. 9, 2020, 62 pages.
Final Office Action for U.S. Appl. No. 14/640,860, dated Apr. 14, 2020, 85 pages.
Final Office Action for U.S. Appl. No. 15/446,283, dated Apr. 22, 2020, 17 pages.
Final Office Action for U.S. Appl. No. 14/721,437, dated Apr. 16, 2020, 103 pages.
Final Office Action for U.S. Appl. No. 11/927,623, dated Jun. 12, 2020, 15 pages.
Mikhed, V., et al., "Testing for Bubbles in Housing Markets: A Panel Data Approach," The Journal of Real Estate Finance and Economics, vol. 38, 2007, pp. 366-386.
Nazerzadeh, H., "Internet Advertising: Optimization and Economic Aspects," Stanford University, 2009, 6 pages.
Non-Final Office Action for U.S. Appl. No. 15/789,617, dated Mar. 26, 2020, 37 pages.
Non-Final Office Action for U.S. Appl. No. 16/125,318, dated Mar. 13, 2020, 20 pages.
Notice of Allowance for U.S. Appl. No. 15/439,388, dated Jan. 23, 2020, 12 pages.
Notice of Allowance for U.S. Appl. No. 15/439,388, dated May 27, 2020, 12 pages.
Notice of Allowance for U.S. Appl. No. 14/078,076, dated Apr. 10, 2020, 9 pages.
Notice of Allowance for U.S. Appl. No. 14/078,076, dated May 20, 2020, 17 pages.
Remodeling Magazine, Remodeling Cost vs Value Report 2006, Hanley Wood LLC, pp. 1-6.
Turner, J., "Ad Slotting and Pricing: New Media Planning Models for New Media," Carnegie Mellon University, Apr. 23, 2010, 132 pages.
Alford, P., "Rent Ratio Tells You Whether Renting or Buying is the Better Deal." Forbes.com, Nov. 2, 2021 pp. 1-4. <https://www.forbes.com/sites/greatspeculations/2010/11/02/rent-ratio-tells-you-whether-renting-or-buying-is-the-better-deal/?sh=701a7ed6e9d0>.
Beckhart, "No Intrinsic Value: The Failure of Traditional Real Estate Appraisal Methods to Value Income-Producing Property," 66 S. Cal. L. Rev. 2251, 1993.
Final Office Action for U.S. Appl. No. 11/927,623, dated Apr. 1, 2021, 18 pages.
Final Office Action for U.S. Appl. No. 13/828,680, dated Dec. 15, 2020, 59 pages.
Final Office Action for U.S. Appl. No. 14/524,148, dated Jan. 29, 2021, 55 pages.
Final Office Action for U.S. Appl. No. 14/709,719, dated Mar. 9, 2021, 42 pages.
Final Office Action for U.S. Appl. No. 16/449,210, dated Aug. 20, 2021, 18 pages.
Final Office Action for U.S. Appl. No. 15/715,098, dated Jul. 13, 2021, 31 pages.
Final Office Action for U.S. Appl. No. 15/789,617, dated Sep. 3, 2020, 45 pages.
Final Office Action for U.S. Appl. No. 16/125,318, dated Aug. 25, 2020, 25 pages.
Final Office Action for U.S. Appl. No. 16/235,009, dated Jul. 13, 2020; 21 pages.
Hamzaoui, Y. E.et al., "Application of Artificial Neural Networks to Predict the Selling Price in the Real Estate Valuation Process," 2011 10th Mexican International Conference on Artificial Intelligence, Puebla, 2011, pp. 175-181 (Year: 2011).
Himmelberg, C. et al., "Assessing High House Prices: Bubbles, Fundamentals and Misperceptions," Journal of Economic Perspectives, 2005, v19(4, Fall), pp. 1-42.
Igan et al., "Global Housing Cycles," IMF Working Paper, Aug. 2012, pp. 1-55.
Jianxiao, G. et al., "Analysis of influencing factors in real estate prices based on stochastic gradient regression model," 2009 16th International Conference on Industrial Engineering and Engineering Management, Beijing, 2009.
Khalafallah, A. "Neural network based model for predicting housing market performance," in Tsinghua Science and Technology, vol. 13, No. S1, pp. 325-328, Oct. 2008 (Year: 2008).
Liang, Y. et al., "Research on real estate and its application of refraining the speculation," BioTechnology, An Indian Journal, 10(9), 3160-3166, 2014.
New CoreLogic Data Reveals Q2 Negative Equity Declines in Hardest Hit Markets and 8 Million Negative Equity Borrowers Have Above Market Rates, CoreLogic Press Release. Sep. 13, 2011, 5 pages.
Non-Final Office Action for U.S. Appl. No. 11/927,623, dated Nov. 12, 2020, 19 pages.
Non-Final Office Action for U.S. Appl. No. 13/828,680, dated Jul. 27, 2020, 66 pages.
Non-Final Office Action for U.S. Appl. No. 14/325,094, dated Aug. 10, 2020, 53 pages.

(56) References Cited

OTHER PUBLICATIONS

Non-Final Office Action for U.S. Appl. No. 14/709,719, dated Sep. 4, 2020, 38 pages.
Non-Final Office Action for U.S. Appl. No. 14/709,719, dated Aug. 4, 2021, 40 pages.
Non-Final Office Action for U.S. Appl. No. 14/721,437, dated Jan. 4, 2021, 72 pages.
Non-Final Office Action for U.S. Appl. No. 15/446,283, dated Jul. 27, 2020, 21 pages.
Non-Final Office Action for U.S. Appl. No. 15/715,098, dated Jan. 4, 2021, 26 pages.
Non-Final Office Action for U.S. Appl. No. 15/789,617, dated Mar. 11, 2021, 52 pages.
Non-Final Office Action for U.S. Appl. No. 16/916,552, dated Aug. 30, 2021, 10 pages.
Non-Final Office Action for U.S. Appl. No. 16/125,318, dated Apr. 29, 2021, 25 pages.
Non-Final Office Action for U.S. Appl. No. 16/129,282, dated Feb. 1, 2021, 33 pages.
Non-Final Office Action for U.S. Appl. No. 16/235,009, dated Dec. 4, 2020, 9 pages.
Non-Final Office Action for U.S. Appl. No. 16/449,210, dated Mar. 26, 2021, 17 pages.
Non-Final Office Action for U.S. Appl. No. 16/748,172, dated May 12, 2021, 58 pages.
Notice of Allowance for U.S. Appl. No. 15/789,617, dated Aug. 23, 2021, 43 pages.
Notice of Allowance for U.S. Appl. No. 16/916,552, dated Sep. 22, 2021, 9 pages.
Notice of Allowance for U.S. Appl. No. 14/325,094, dated Dec. 16, 2020, 10 pages.
Notice of Allowance for U.S. Appl. No. 14/721,437, dated Apr. 14, 2021, 13 pages.
Notice of Allowance for U.S. Appl. No. 14/846,632, dated Sep. 16, 2020, 11 pages.
Notice of Allowance for U.S. Appl. No. 16/235,009, dated Mar. 24, 2021, 7 pages.
The Tim. Top 30 Cities: Price to Rent & Price to Income Ratios (2011). Seattle Bubble, Mar. 29, 2013, 14 pages.
Trulia.com. Trulia's rent vs. buy index reveals top 10 cities for renting, owning homes. Oct. 2010, pp. 1-4.
Visa, "Card-Not-Present Security—A Multi Layered Approach to Payment Card Security," <www.tdcanadatrust.com>, 2006, 17 pages.
U.S. Appl. No. 17/025,330 for Abdallah et al., filed Sep. 18, 2020.
Non-Final Office Action for U.S. Appl. No. 14/524,148, dated Aug. 3, 2020, 65 pages.
Non-Final Office Action for U.S. Appl. No. 14/640,860, dated Jul. 15, 2021, 109 pages.
Non-Final Office Action for U.S. Appl. No. 14/524,148, dated Aug. 19, 2021, 83 pages.
Dialog NPL (Non-Patent Literatures) Search Report, dated Sep. 21, 2021 (Year: 2021).
Final Office Action for U.S. Appl. No. 16/748,172, dated Nov. 16, 2021, 18 pages.
Google Scholar Article NPL Search Report, Sep. 21, 2021 (Year: 2021).
Google Scholar Case Law NPL Search Report, Sep. 21, 2021 (Year: 2021).
Non-Final Office Action for U.S. Appl. No. 11/927,623, dated Nov. 18, 2021, 14 pages.
Non-Final Office Action for U.S. Appl. No. 15/715,098, dated Oct. 21, 2021, 32 pages.
Notice of Allowance for U.S. Appl. No. 16/665,426, dated Nov. 18, 2021, 20 pages.
Notice of Allowance for U.S. Appl. No. 15/789,617, dated Dec. 24, 2021, 6 pages.
Notice of Allowance for U.S. Appl. No. 16/125,318, dated Sep. 29, 2021, 12 pages.
U.S. Appl. No. 17/002,969 for Bruce et al., filed Aug. 26, 2020.
U.S. Appl. No. 17/130,922 for Ma et al., filed Dec. 22, 2020.
U.S. Appl. No. 17/206,838 for Bruce et al., filed Mar. 19, 2021.
U.S. Appl. No. 17/373,446 for Humphries et al., filed Jul. 12, 2021.
U.S. Appl. No. 16/748,172 for Wang et al., filed Jan. 21, 2020.

* cited by examiner recent listings table — 200

| id | address | sq. ft. | bedrooms | bathrooms | floors | view | year | listing price | date |
|---|---|---|---|---|---|---|---|---|---|
| 1 | 1611 Coleman Drive, Gloucester, VA 23189 | 2280 | 4 | 3 | 2 | no | 1995 | $245,000 | 7/30/12 |
| 2 | 252 Zelkova Road, Williamsburg, VA 23185 | 2100 | 3 | 2 | 2 | yes | 2001 | $266,000 | 6/16/12 |
| 3 | 4521 Hilltop Drive, Clinton, VA 23698 | 2240 | 3 | 2 | 2 | Yes | 1986 | $259,000 | 7/19/12 |
| 4 | 574 New England Turnpike, New London, VA 23758 | 1640 | 2 | 1 | 2 | yes | 2009 | $163,500 | 5/17/12 |
| 5 | 1433 Green River Rd SW, Harrisonburg, VA 23752 | 1690 | 2 | 2 | 2 | no | 1963 | $225,500 | 6/13/12 |
| 6 | 38150 N 7th Ave N, Williamsburg, VA 23185 | 2300 | 2 | 1 | 1 | no | 1966 | $239,000 | 6/22/12 |
| 7 | 4326 W Ardmore Rd, Williamsburg, VA 23117 | 1590 | 2 | 2 | 1 | no | 1980 | $225,000 | 7/19/12 |
| 8 | 42231 N Celebration Way, Williamsburg, VA 23185 | 1900 | 3 | 1 | 2 | yes | 2001 | $245,000 | 6/12/12 |
| 9 | 8430 N 15th St, Williamsburg, VA 23185 | 1500 | 3 | 2 | 1 | no | 1982 | $185,000 | 7/23/12 |
| 10 | 29425 N 49th St, Harrisonburg, VA 24187 | 1200 | 2 | 2 | 1 | no | 1985 | $166,000 | 7/25/12 |
| 11 | 1006 E Mountain Vista Drive, Harrisonburg, VA 22896 | 1480 | 3 | 2 | 2 | yes | 2002 | $140,000 | 6/27/12 |
| 12 | 2743 E Sierra St, Harrisonburg, VA 99742 | 1535 | 4 | 1 | 1 | no | 1966 | $125,000 | 7/10/12 |
| 13 | 22378 N 70th Dr, Arlington, VA 22202 | 1965 | 2 | 2 | 1 | yes | 2001 | $255,000 | 7/18/12 |
| 14 | 4631 E Michelle Dr, Arlington, VA 22741 | 1110 | 3 | 2 | 2 | no | 1997 | $167,000 | 7/7/12 |
| 15 | 19 Quaker Ridge Rd, Arlington, VA 22801 | 1295 | 2 | 1 | 1 | no | 1988 | $140,000 | 6/19/12 |

*FIG. 2*

| id | address | bedrooms | view | listing price |
|---|---|---|---|---|
| 1 | 1611 Coleman Drive, Gloucester, VA 23189 | 4 | no | $245,000 |
| 2 | 252 Zelkova Road, Williamsburg, VA 23185 | 3 | yes | $266,000 |
| 8 | 42231 N Celebration Way, Williamsburg, VA 23185 | 3 | yes | $245,000 |
| 9 | 8430 N 15th St, Williamsburg, VA 23185 | 3 | no | $185,000 |
| 11 | 1006 E Mountain Vista Drive, Harrisonburg, VA 22896 | 3 | yes | $140,000 |
| 13 | 22378 N 70th Dr, Arlington, VA 22202 | 2 | yes | $255,000 |
| 15 | 19 Quaker Ridge Rd, Arlington, VA 22801 | 2 | no | $140,000 | tree 1 training table 400

FIG. 4

| id | address | bedrooms | view | actual listing price | estimated listing price | error |
|---|---|---|---|---|---|---|
| 3 | 4521 Hilltop Drive, Clinton, VA 23698 | 3 | yes | $259,000 | $217,000 | 0.1935 |
| 4 | 574 New England Turnpike, New London, VA 00758 | 2 | yes | $163,500 | $197,500 | 0.1722 |
| 5 | 1433 Green River Rd SW, Harrisonburg, VA 88752 | 2 | no | $225,500 | $197,500 | 0.1418 |
| 6 | 38150 N 7th Ave N, Williamsburg, VA 23185 | 2 | no | $239,000 | $197,500 | 0.2101 |
| 7 | 4326 W Ardmore Rd, Williamsburg, VA 23117 | 2 | no | $225,000 | $197,500 | 0.1392 |
| 10 | 29425 N 49th St, Harrisonburg, VA 24187 | 2 | no | $166,000 | $197,500 | 0.1595 |
| 12 | 2743 E Sierra St, Harrisonburg, VA 99742 | 4 | no | $125,000 | $215,000 | 0.5814 |
| 14 | 4631 E Michelle Dr, Arlington, VA 22741 | 3 | no | $167,000 | $215,000 | 0.2874 | median err. 0.1829

FIG. 8 recent listings and sales table — 1000

| id | address | sq. ft. | bedrooms | bathrooms | floors | view | year | listing date | listing price | sale date | selling price |
|---|---|---|---|---|---|---|---|---|---|---|---|
| 1 | 1000 Coney Island Ave, Williamsburg, VA 23742 | 2280 | 4 | 3 | 2 | no | 1995 | 2/25/12 | $245,000 | 4/30/12 | $235,000 |
| 2 | 2962 Dunedin Cir, Williamsburg, VA 23114 | 2100 | 3 | 2 | 2 | yes | 2001 | 4/21/12 | $266,000 | 5/16/12 | $254,000 |
| 3 | 1500 Vance Ave, Williamsburg, VA 23174 | 2240 | 3 | 2 | 2 | yes | 1986 | 5/23/12 | $259,000 | 7/19/12 | $251,000 |
| 4 | 915 E 7th St, Harrisonburg, VA 24887 | 1640 | 2 | 1 | 2 | yes | 2009 | 1/18/12 | $163,500 | 2/17/12 | $142,500 |
| 5 | 91157 1st St, Harrisonburg, VA 24478 | 1690 | 2 | 2 | 2 | no | 1963 | 2/9/12 | $225,500 | 3/13/12 | $205,000 |
| 6 | 9257 Raleigh Terrace Rd, Harrisonburg, VA 24741 | 2300 | 2 | 2 | 1 | no | 1966 | 4/22/12 | $239,000 | 6/22/12 | $225,000 |
| 7 | 5478 Leadsville Ave, Williamsburg, VA 23213 | 1590 | 2 | 1 | 1 | no | 1980 | 5/19/12 | $225,000 | 6/3/12 | $212,000 |
| 8 | 1 Industrial Plaza S, Williamsburg, VA 23441 | 1900 | 3 | 2 | 2 | yes | 2001 | 2/30/12 | $245,000 | 4/12/12 | $225,000 |
| 9 | 1100 Elm Drive, Williamsburg, VA 23559 | 1500 | 3 | 1 | 1 | no | 1982 | 4/28/12 | $185,000 | 5/23/12 | $182,500 |
| 10 | 2214 Main St E, Williamsburg, VA 23185 | 1200 | 2 | 2 | 1 | no | 1985 | 2/12/12 | $166,000 | 3/25/12 | $160,000 |
| 11 | 87 Acme Blvd, Williamsburg, VA 23185 | 1480 | 3 | 2 | 2 | yes | 2002 | 4/3/12 | $140,000 | 6/27/12 | $133,000 |
| 12 | 15 Clifford St SE, Williamsburg, VA 23351 | 1535 | 4 | 1 | 1 | no | 1966 | 6/15/12 | $125,000 | 7/10/12 | $122,500 |
| 13 | 33 Paula Lane, Harrisonburg, VA 24745 | 1965 | 2 | 2 | 1 | yes | 2001 | 6/3/12 | $255,000 | 8/18/12 | $239,000 |
| 14 | 574 New England Turnpike, New London, VA 23758 | 1110 | 3 | 2 | 2 | no | 1992 | 3/24/12 | $167,000 | 5/7/12 | $162,500 |
| 15 | 1433 Green River Rd SW, Harrisonburg, VA 24752 | 1295 | 2 | 1 | 1 | no | 1988 | 2/10/12 | $140,000 | 4/19/12 | $132,000 |

*FIG. 10*

FIG. 13 recent listings and synthetic sales table — 1300

| id | address | sq. ft. | bedrooms | bathrooms | floors | view | year | listing price | date | synthetic sale price |
|---|---|---|---|---|---|---|---|---|---|---|
| 1 | 305 Dune St., Williamsburg, VA 23189 | 2280 | 4 | 3 | 2 | no | 1995 | $245,000 | 7/30/12 | $229,000 |
| 2 | 1335 Farrell Road, Williamsburg, VA 23185 | 2100 | 3 | 2 | 2 | yes | 2001 | $266,000 | 6/16/12 | $249,500 |
| 3 | 1228 Sexton Drive, Arlington, VA 22698 | 2240 | 3 | 2 | 2 | yes | 1986 | $259,000 | 7/19/12 | $246,000 |
| 4 | 7878 16th St., Williamsburg, VA 23758 | 1640 | 2 | 1 | 2 | yes | 2009 | $163,500 | 3/17/12 | $161,000 |
| 5 | 149 Red River Rd S, Arlington, VA 22752 | 1690 | 2 | 2 | 2 | no | 1963 | $225,500 | 7/13/12 | $222,000 |
| 6 | 1135 8th Ave N, Williamsburg, VA 23185 | 2300 | 2 | 2 | 1 | no | 1966 | $239,000 | 2/22/12 | $232,000 |
| 7 | 6689 Williams Rd, Williamsburg, VA 23117 | 1590 | 2 | 1 | 1 | no | 1980 | $225,000 | 1/19/12 | $218,500 |
| 8 | 246 Partison Ave, Williamsburg, VA 23185 | 1900 | 3 | 2 | 2 | yes | 2001 | $245,000 | 3/12/12 | $242,000 |
| 9 | 9844 N 18th St, Williamsburg, VA 23185 | 1500 | 3 | 1 | 1 | no | 1982 | $185,000 | 5/23/12 | $179,000 |
| 10 | 1313 Robin Way, Arlington, VA 22187 | 1200 | 2 | 2 | 1 | no | 1985 | $166,000 | 3/25/12 | $161,500 |
| 11 | 4593 E Hillside Drive, Williamsburg, VA 23896 | 1480 | 3 | 2 | 2 | yes | 2002 | $140,000 | 5/27/12 | $136,000 |
| 12 | 855256 Valley Road, Williamsburg, VA 23742 | 1535 | 4 | 1 | 1 | no | 1966 | $125,000 | 7/10/12 | $122,000 |
| 13 | 7832 16th Ave, Arlington, VA 22854 | 1965 | 2 | 2 | 1 | yes | 2001 | $255,000 | 6/18/12 | $245,000 |
| 14 | 7923 Darling Rd, Arlington, VA 22741 | 1110 | 3 | 2 | 2 | no | 1993 | $167,000 | 5/7/12 | $160,000 |
| 15 | 1367 Movington St, Arlington, VA 22801 | 1295 | 2 | 1 | 1 | no | 1988 | $140,000 | 3/19/12 | $135,500 |

FIG. 17 recent listings history table — 1700

| MLS listing # | address | listing price | listing date | end date | days on market | end reason | sale/relisting price |
|---|---|---|---|---|---|---|---|
| 1 | 15 W High Drive, Spokane, WA 99203 | $800,000 | 4/5/2012 | 8/16/2012 | 133 | relisted | $710,000 |
| 2 | 4502 S. Manito Blvd., Spokane, WA 99203 | $365,000 | 9/18/2012 | 9/21/2012 | 3 | sold | $365,000 |
| 3 | 15 W High Drive, Spokane, WA 99203 | $710,000 | 8/16/2012 | 10/10/2012 | 55 | sold | $695,000 |
| 4 | 4114 S. Bernard St., Spokane, WA 99203 | $419,900 | 6/13/2012 | 10/15/2012 | 124 | withdrawn | --- |
| 5 | 309 W. 42nd Ave., Spokane, WA 99203 | $314,159 | 10/1/2012 | --- | 16 | active | --- |

TIME ON MARKET AND LIKELIHOOD OF SALE PREDICTION

CROSS REFERENCE TO RELATED APPLICATION(S)

This application is related to U.S. patent application Ser. No. 11/971,758, filed Jan. 9, 2008, entitled "AUTOMATICALLY DETERMINING A CURRENT VALUE FOR A HOME," which is incorporated herein in its entirety by reference, and to U.S. patent application Ser. No. 13/417,804, filed Mar. 12, 2012, entitled "AUTOMATICALLY DETERMINING A CURRENT VALUE FOR A HOME," which is incorporated herein in its entirety by reference, and to U.S. patent application Ser. No. 13/843,577, filed March 2013, entitled "TIME ON MARKET AND LIKELIHOOD OF SALE PREDICTION," which is incorporated herein in its entirety by reference. Where a document incorporated by reference and the present disclosure are inconsistent, the present disclosure controls.

BACKGROUND

When preparing to sell a home or other real estate property, the owner must determine a price at which to list the home for sale. Conventionally, a homeowner will hire a real estate professional to evaluate the home, provide a comparative market analysis of properties that the professional deems comparable, and recommend a listing price for the home based on the professional's experience and knowledge of the local market.

BRIEF DESCRIPTION OF THE DRAWINGS

FIG. 2 is a table diagram showing sample contents of a recent listings table.

FIG. 4 is a table diagram showing sample contents of a table containing a training set comprising the selected listings and selected attributes for training the tree.

FIG. 8 is a table diagram showing sample results for testing a tree.

FIG. 10 is a table diagram showing sample contents of a recent listings and sales table.

FIG. 13 is a table diagram showing sample contents of a recent listings table including synthetic sale prices.

FIG. 17 is a table diagram showing sample contents of a recent listings history table.

DETAILED DESCRIPTION

Overview

Figure 1:
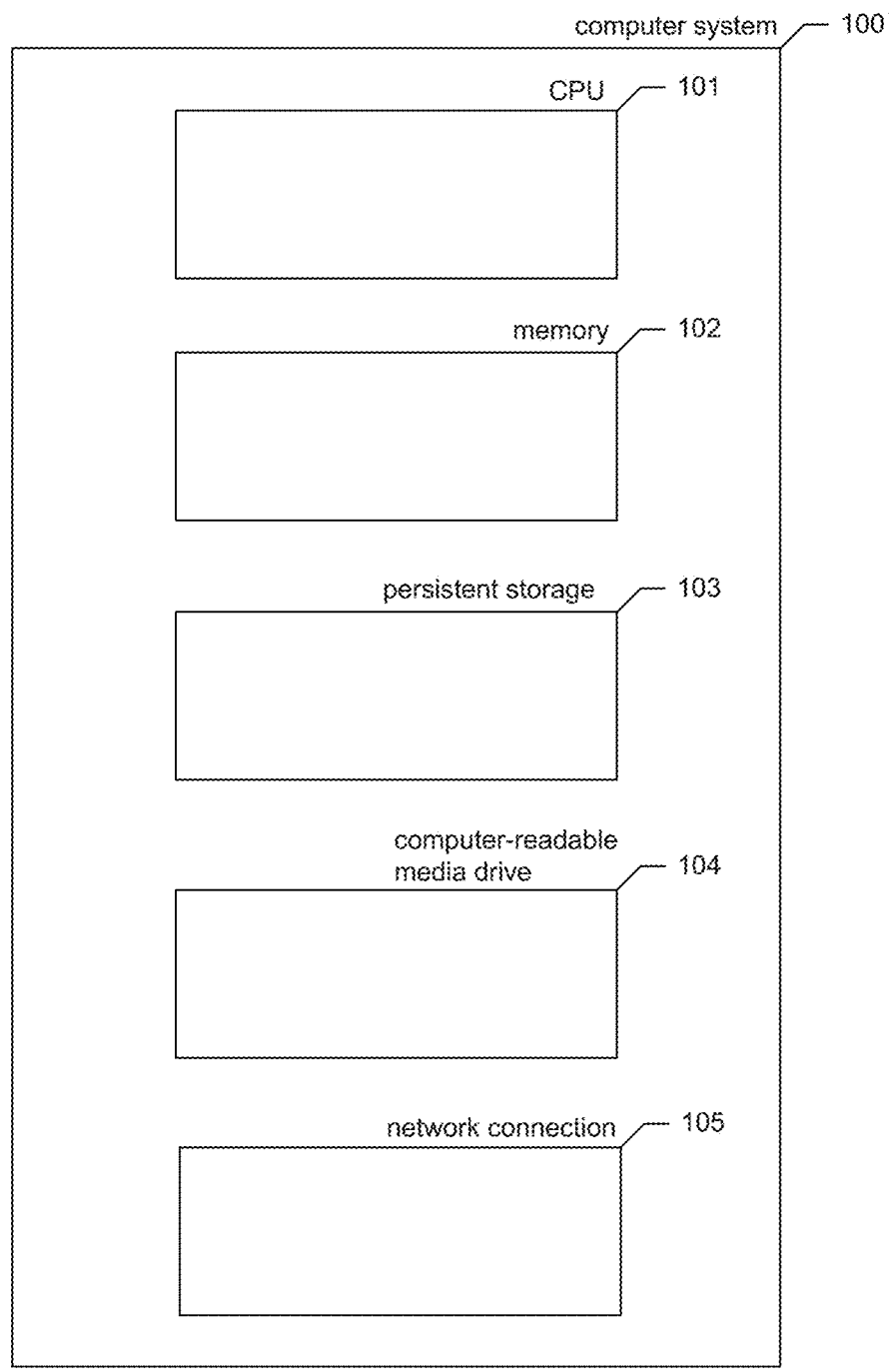
FIG. 1 is a block diagram showing some of the components typically incorporated in at least some of the computer systems and other devices on which the facility executes.

The inventors have determined that, in many roles, it can be useful to be able to accurately determine the value of residential real estate properties ("homes") and to accurately predict the likelihood that homes will be sold and the length of time homes will remain on the market when listed for sale at various prices. As examples, by using accurate time on market and likelihood of sale predictions for homes: sellers and their agents can optimally set listing prices; buyers and their agents can determine offer timing strategies and appropriate offer amounts; and analysts can gauge market trends and assess the health of real estate markets.

Accordingly, the inventors have recognized that a new approach to valuing houses and estimating time on market and likelihood of sale that is more universally accurate, less expensive, and more convenient would have significant utility.

A software and/or hardware facility for automatically determining a current value for a home or other property, estimating the length of time a home or other property will be on the market at a listing price, and/or predicting the likelihood of sale of a home at a listing price ("the facility") is described. Though the following discussion liberally employs the words "home," "house," and "housing" to refer to the property being valued, those skilled in the art will appreciate that the facility may be straightforwardly applied to properties of other types.

In some embodiments, the facility estimates a probability that a home will be sold if listed at a particular price. For example, the facility might estimate the probability that a home will be sold within some period (e.g., three months) if listed at a particular price, or estimate a range of probabilities that a home will be sold within some period.

In some embodiments, the facility estimates the number of days that a home will remain on the market before sale if initially listed at a particular price. For example, the facility might estimate the probable length of time a home will remain unsold up to some maximum (e.g., >180 days) if listed at a particular price, or estimate a range of durations that a home will remain on the market at a particular listing price.

To generate an estimate of the likelihood of sale for a home or an estimate of time on the market until sale for a home, the facility applies, in various embodiments, one or more probability distribution models. In some embodiments, the facility employs a parametric estimation model, e.g., linear regression. In some embodiments, the facility employs a random forest regression model. In some embodiments, the facility employs a multilevel hierarchical model. In some embodiments, the facility employs survival analysis to estimate time on market. In some embodiments, the facility employs a probabilistic model or logistic regression, e.g., binomial regression, to estimate probability of sale.

Such models use independent variables including a particular price and, e.g., a home valuation, home attribute values, and relevant market data. In various embodiments, a model for estimating a likelihood of sale or a model for estimating time on market, for example, produces estimations based on independent variables including one or more of, e.g., the difference between a valuation of the home and the selected listing price, the difference between an estimated listing price for the home and the selected listing price, values of the home's attributes, market conditions in the home's geographic area, and the difference between the selected listing price and the median price of homes listed or sold in the home's market. In some embodiments, such independent variables include synthetic home attributes (e.g., a valuation ascribed to the home by a model, or imputed home information in place of missing data), or, for a home that is or has recently been on the market, previous listing price and duration information and cumulative days on the market.

Before applying a model to produce estimates based on home data, the facility trains or fits the model and tests or validates the trained or fitted model. To train and test the model, the facility uses listing and sales transaction data describing home listing events associated with homes in a geographic area, with which home attribute values and real estate market data are also associated. Each home listing event comprises, e.g., a listing price, a listing date, and either a sale price and date (for homes that were sold while listed at the listing price) or a date that the listing price was changed or that the listing was removed (for homes that were not sold while listed at the listing price). An example of such recent listing and sales transaction data is discussed in further detail below in connection with FIG. 17.

In some embodiments, the facility applies a model multiple times (e.g., as discussed in further detail below in connection with FIG. 19) to generate and display a set of estimates of a home's likelihood of sale at various listing prices and/or a set of estimates of the length of time a home will remain unsold on the market at various listing prices. For example, the listing prices to which the model is applied may be based on offsets from a home valuation (e.g., prices higher or lower than the valuation by some dollar amount or percentage). In some embodiments, the facility enables a user to select a range of prices, and estimates probabilities that a home will be sold and/or probable time on market if listed at prices within that range.

In some embodiments, the facility displays predictions on a two-axis graph in which, e.g., the horizontal axis represents listing prices and the vertical axis represents probabilities of sale or numbers of days on the market. Examples of such graphs are discussed in further detail below in connection with FIGS. 20 and 21. In some embodiments, both predictions are displayed in one graph (e.g., using multiple vertical scales). An example of such a multi-prediction graph is discussed in further detail below in connection with FIG. 22. In time on market and likelihood of sale estimate graphs, the facility may approximate values between and/or beyond calculated predictions to generate a visual representation such as a substantially continuous line chart or smooth prediction curve or band (e.g., using linear or polynomial interpolation, regression estimation, or other curve fitting). In some embodiments, the facility displays one or more estimations or prediction graphs on a Web page corresponding to the subject home.

In some embodiments, the facility determines listing prices associated with a range of probabilities of sale or a range of time-on-market durations selected by a user. For example, the facility may estimate probability of sale and/or time on market for various listing prices for a home, and identify listing prices that produce the estimates within the selected range. In some embodiments, the facility determines a listing price to obtain a user-specified threshold estimated probability that a home will be sold or estimated duration of time within which a home will be sold (e.g., for a seller interested in a quick sale, the highest listing price at which the home is estimated to have a 95% likelihood of sale, the highest listing price at which the home is estimated to sell within 15 days on the market, or the highest listing price at which the home is estimated to have a 90% likelihood of sale within 30 days).

In some embodiments, the facility establishes, for each of a number of geographic regions, a model of housing prices in that region. This model transforms inputs corresponding to home attribute values into an output constituting a predicted current value of a home in the corresponding geographic area having those attributes. In order to determine the current value of a particular home, the facility selects the model for a geographic region containing the home, and subjects the values of the home's attribute values to the selected model.

In some embodiments, the model used by the facility to value homes is a complex model made up of (a) a number of different sub-models each producing a valuation based on values of the attributes of a home, together with (b) a meta-model that uses values of attributes of the home to determine a way to combine the sub-model valuations to obtain a valuation of the home by the complex model, such as by determining a relative weighting of the sub-model valuations. In some embodiments, one or more sub-model valuations can be based on other sub-model valuations as well as values of the attributes of a home.

In some embodiments, among the sub-models of the complex model is a listing price model that generates an estimated listing price for a home based on information about the home. An estimated listing price is an estimate of the listing price that would be attributed to a home if its owner listed it for sale. The meta-model combines home attributes, valuation inputs from various valuation models, and a listing price from a listing price model in producing an overall valuation.

In some embodiments, the facility constructs and/or applies housing price models or sub-models each constituting a forest of classifying decision trees. In some such embodiments, the facility uses a data table that identifies, for each of a number of homes recently sold in the geographic region to which the forest corresponds, attributes of the home and its selling price. For each of the trees comprising the forest, the facility randomly selects a fraction of homes identified in the table, as well as a fraction of the attributes identified in the table. The facility uses the selected attributes of the selected homes, together with the selling prices of the selected homes, to construct a decision tree in which each non-leaf node represents a basis for differentiating selected homes based upon one of the selected attributes. For example, where number of bedrooms is a selected attribute, a non-leaf node may represent the test "number of bedrooms≤4." This node defines two subtrees in the tree: one representing the selected homes having four or fewer bedrooms, the other representing the selected homes having five or more bedrooms. Each leaf node of the tree represents all of the selected homes having attributes matching the ranges of attribute values corresponding to the path from the tree's root node to the leaf node. The facility stores in each leaf node a list of the selling prices of the selected homes represented by the leaf node or assigns each leaf node a value corresponding to an average (e.g., the mean) of the selling prices of the selected homes represented by the leaf node.

In some embodiments, one or more of the models or sub-models is trained using data in the data table that identifies homes listed for sale and synthetic sales prices based on their listing prices, either together with or instead of data identifying recently sold homes and their selling prices. A listing price adjustment model generates these synthetic sales prices from attributes of homes that have been listed for sale and their listing prices. In a geographic area or other set of homes for which the number of recently sold homes is very small or zero but some homes have been listed for sale, home valuations may be estimated solely on the basis of such a listing price adjustment model. The listing price adjustment model is trained using data including the listing prices, selling prices, and attributes of sold homes.

In order to weight the trees of the forest, the facility further tests the usefulness of each tree by applying the tree to homes in the table other than the homes that were selected to construct the tree, and, for each such home, comparing the value indicated for the home by the decision tree (i.e., the value of the root leaf node into which the tree classifies the home) to its selling price. The closer the values indicated by the tree to the selling prices, the higher the rating for the tree.

In order to value a home using such a forest of trees model, the facility uses the attributes of the home to traverse each tree of the forest to a leaf node of the tree. In some embodiments, the facility then concatenates the selling prices from all of the traversed-to leaf nodes, and selects a robust statistic (e.g., the median) of the selling prices from the concatenated list as the valuation of the home. This approach is sometimes referred to as using a "quantile regression forest." In some embodiments, the values in each leaf node are weighted according to the rating for the tree.

In most cases, it is possible to determine the attribute values of a home to be valued. For example, they can often be obtained from existing tax or sales records maintained by local governments. Alternatively, a home's attributes may be inputted by a person familiar with them, such as the owner, a listing agent, or a person that derives the information from the owner or listing agent. In order to determine a value for a home whose attributes are known, the facility applies all of the trees of the forest to the home, so that each tree indicates a value for the home. The facility then calculates an average of these values, each weighted by the rating for its tree, to obtain a value for the home. In various embodiments, the facility presents this value to the owner of the home, a prospective buyer of the home, a real estate agent, or another person interested in the value of the home or the value of a group of homes including the home.

In some areas of the country, home selling prices are not public records, and may be difficult or impossible to obtain. Accordingly, in some embodiments, the facility estimates the selling price of a home in such an area based upon loan values associated with its sale and an estimated loan-to-value ratio.

In some embodiments, the facility uses a decision tree to impute attribute values for a home that are missing from attribute values obtained for the home.

In some embodiments, the facility employs a variety of heuristics for identifying "outlier" homes, listings, and/or sales transactions and other kinds of data undesirable for training a model and excluding them from data used by the facility to construct valuation models. For example, in some embodiments, the facility filters out data describing listings or sales of distressed homes in a geographic area, e.g., homes that have been foreclosed on or homes whose mortgages are in default. In some embodiments, the facility identifies such listings by, e.g., locating keywords in a property sale description. In some embodiments, the facility also excludes listings created by real estate agents who have been identified for creating listings with inaccurate information or priced outside a predetermined tolerance of expected or median listing prices (i.e., agents seen as having a large degree of data error or pricing error), or listings associated with brokers seen as having a large degree of error. In some embodiments, the facility maintains a list of such agents and/or brokers. Those skilled in the art will appreciate that a variety of other filters could be used.

In some embodiments, the facility regularly applies its model to the attributes of a large percentage of homes in a geographic area to obtain and convey an average home value for the homes in that area. In some embodiments, the facility periodically determines an average home value for the homes in a geographic area, and uses them as a basis for determining and conveying a home value index for the geographic area.

Because the approach employed by the facility to determine the value of a home does not rely on the home having recently been sold, it can be used to accurately value virtually any home whose attributes are known or can be determined. Further, because this approach does not require the services of a professional appraiser, it can typically determine a home's value quickly and inexpensively, in a manner generally free from subjective bias. Additionally, by supplementing valuation models that rely on actual home sale transactions with models incorporating synthetic sale transactions for homes that have been listed for sale, the sizes of training and testing data sets can be increased and the accuracy of the facility's valuation estimates can be improved.

DESCRIPTION OF FIGURES

FIG. 1 is a block diagram showing some of the components typically incorporated in at least some of the computer systems and other devices on which the facility executes. These computer systems and devices 100 may include one or more central processing units ("CPUs") 101 for executing computer programs; a computer memory 102 for storing programs and data—including data structures, database tables, other data tables, etc.—while they are being used; a persistent storage device 103, such as a hard drive, for persistently storing programs and data; a computer-readable media drive 104, such as a CD-ROM drive, for reading programs and data stored on a computer-readable medium; and a network connection 105 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

FIG. 2 is a table diagram showing sample contents of a recent listings table. The recent listings table 200 is made up of rows 201-215, each representing a home listing that occurred in a recent period of time, such as the preceding 60 days. Each row is divided into the following columns: an identifier column 221 containing an identifier for the listing; an address column 222 containing the address of the listed home; a square foot column 223 containing the floor area of the home; a bedrooms column 224 containing the number of bedrooms in the home; a bathrooms column 225 containing the number of bathrooms in the home; a floors column 226 containing the number of floors in the home; a view column 227 indicating whether the home has a view; a year column 228 showing the year in which the home was constructed; a listing price column 229 containing the listing price at which the home was listed; and a date column 230 showing the date on which the home was listed.

For example, row 201 indicates that listing number 1, of the home at 1611 Coleman Drive, Gloucester, VA 23189 having a floor area of 2280 square feet, 4 bedrooms, 3 bathrooms, 2 floors, no view, built in 1995, was for $245,000, and occurred on Jul. 30, 2012. Though the contents of recent listings table 200 are included to present a comprehensible example, those skilled in the art will appreciate that the facility can use a recent listings table having columns corresponding to different and/or a larger number of attributes, as well as a larger number of rows. Attributes that may be used include, for example, construction materials, cooling technology, structure type, fireplace type, parking structure, driveway, heating technology, swimming pool type, roofing material, occupancy type, home design type, view type, view quality, lot size and dimensions, number of rooms, number of stories, school district, longitude and latitude, neighborhood or subdivision, tax assessment, attic and other storage, etc. For a variety of reasons, certain values may be omitted from the recent listings table. In some embodiments, the facility imputes missing values using the median value in the same column for continuous variables, or the mode (i.e., most frequent) value for categorical values.

Though FIG. 2 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Figure 3:
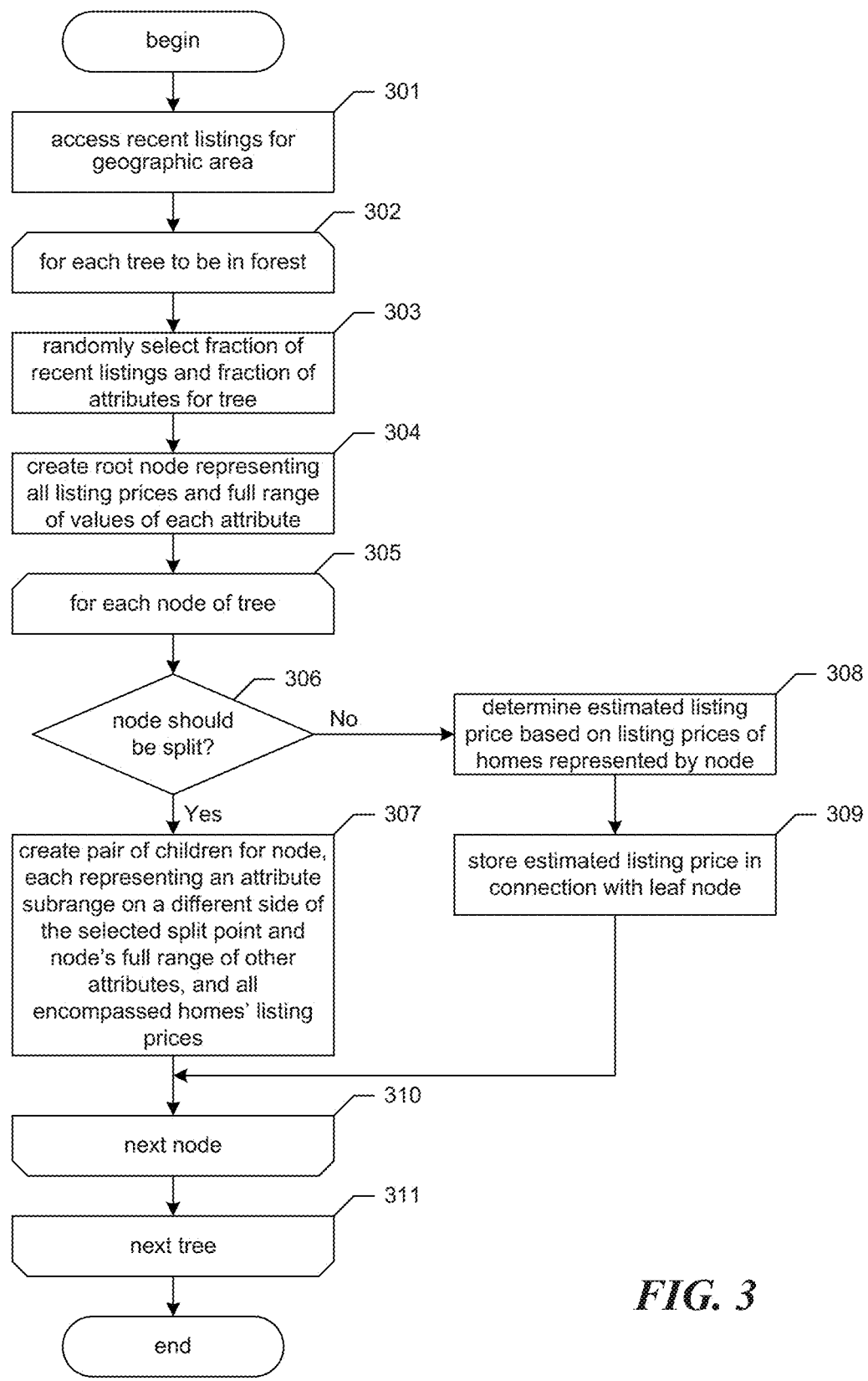
FIG. 3 is a flow diagram showing steps typically performed by the facility in order to create and train a forest of listing-price-estimating decision trees.

FIG. 3 is a flow diagram showing steps typically performed by the facility in some embodiments in order to prepare a model to be able to predict listing prices for homes in a geographic area by creating and training a forest of listing-price-estimating decision trees. In various embodiments, the facility performs these steps for one or more geographic areas of one or more different granularities, including neighborhood, city, county, state, country, etc. In some embodiments these steps are performed periodically for each geographic area, such as daily. In some embodiments, the facility constructs and applies random forest valuation models using an R mathematical software package available at cran.r-project.org/ and described at cran.r-project.org/web/packages/randomForest/randomForest.pdf.

In step 301, the facility accesses recent listing transactions occurring in the geographic area. The facility may use listings data obtained from a variety of public or private sources. In some embodiments, the facility filters the listings data to exclude listings such as outlier listings and unreliable listings as described in greater detail above. An example of such listings data is the table shown in FIG. 2. In step 302, the facility begins with a first tree and carries out steps 303-310 for each tree to be created in the forest. The number of trees, such as 100, is configurable, with larger numbers typically yielding better results but requiring the application of greater computing resources. In step 303, the facility randomly selects a fraction of the recent listings in the geographic area to which the tree corresponds, as well as a fraction of the available attributes including listing price, as a basis for training the tree.

FIG. 4 is a table diagram showing sample contents of a table containing a training set comprising the selected listings and selected attributes to be used for training a tree. Tree 1 training table 400 contains rows randomly selected from the recent listings table 200, here rows 201, 202, 208, 209, 211, 213, and 215. The table further includes the identifier column 221, address column 222, and listing price column 229 from the recent listings table, as well as randomly selected columns for two available attributes: a bedrooms column 224 and a view column 227. In various embodiments, the facility selects various fractions of the listing data rows and attribute columns of the recent listings table for inclusion in the training set data for training the tree.

Returning to FIG. 3, in step 304, the facility creates a root node for the tree that represents all of the listings contained in tree 1 training table 400 and the full range of each of the attributes in the table.

Figure 5:
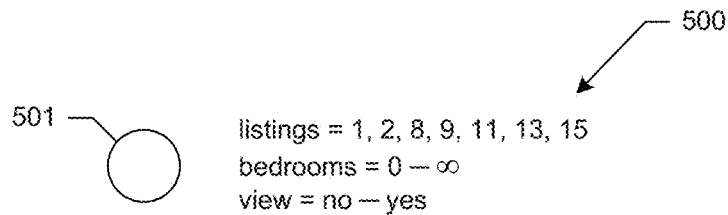
FIG. 5 is a tree diagram showing a root node corresponding to the contents of table 500.

FIG. 5 is a tree diagram showing a single-node tree 500 comprising a root node corresponding to tree 1 training table 400. The root node 501 represents the listings having identifiers 1, 2, 8, 9, 11, 13, and 15 (the entire training set); values of the bedrooms attribute from 0 to ∞; and values of the view attribute of yes and no.

Returning to FIG. 3, in steps 305-310, the facility iterates through each node of the tree, including the root node created in step 304 and any additional nodes added to the tree in step 307. In step 306, if it is possible to "split" the node, i.e., create two children of the node each representing a different subrange of an attribute value range represented by the node, then the facility continues in step 307, else the facility continues in step 308. Further details describing steps typically performed by the facility in order to determine whether and how to split a node of a tree may be found in U.S. patent application Ser. No. 13/417,804, entitled "Automatically Determining a Current Value for a Home," filed Mar. 12, 2012, which is fully incorporated herein by reference.

In step 307, where the facility has determined that the node should be split on the values of some attribute, the facility creates a pair of children for the node. Each child represents one of the subranges of the attribute for splitting identified in step 306 and the node's full range of other attributes. Each child represents all training set listings whose attributes satisfy the attribute ranges represented by the child. Step 307 is discussed in greater detail below in connection with FIG. 6.

In step 308, because the node will not be split to two children, it will be a leaf node. The facility determines an estimated listing price based on the listing prices of the training set listings represented by the node. In some embodiments, the estimated listing price is determined by taking an average (e.g., mean or median) of the listing prices of the home listings represented by the node. In step 309, the estimated listing price is stored in connection with the leaf node. In some embodiments, the set of listing prices represented by the leaf node is stored in connection with the leaf node. In some embodiments, the facility stores an estimated listing price in a separate data structure or by reference to the underlying listings data.

In step 310, the facility processes the next node of the tree. After step 310, no more nodes will be split and the tree is fully constructed, so the facility continues in step 311 to construct and train another tree until a forest containing the desired number of trees has been constructed and trained.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; etc.

Figure 6:
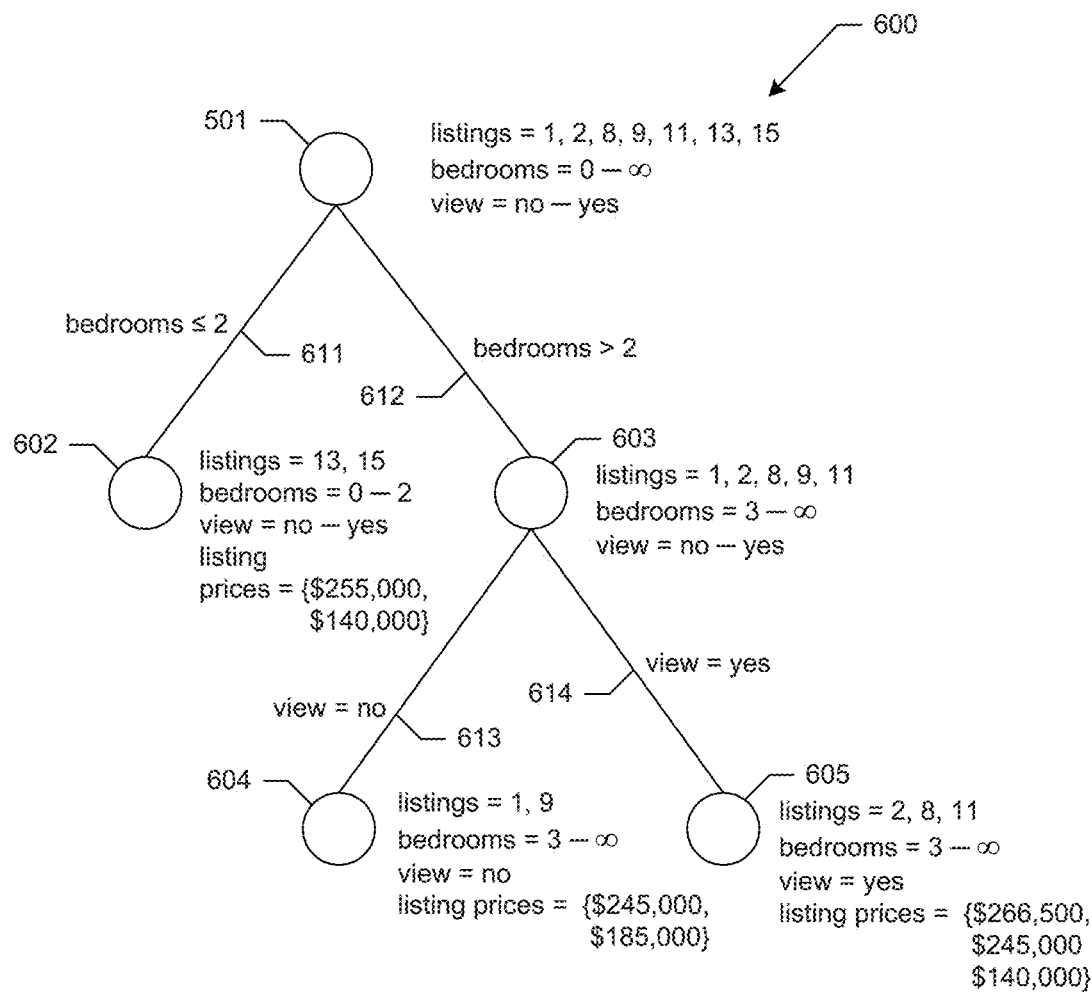
FIG. 6 is a tree diagram showing a completed version of the sample tree.

FIG. 6 is a tree diagram showing a completed version of the sample tree. It can be seen that the facility added child nodes 602 and 603 to root node 501, corresponding to the subranges defined by a split on the bedrooms attribute. Node 602 represents listings whose bedrooms attribute is less than or equal to 2, that is, between 0 and 2, as well as the full range of view attribute values represented by node 501. Accordingly, node 602 represents training set listings 13 and 15, having listing prices $255,000 and $140,000. Node 602 is a leaf node.

Node 603 represents listings with bedrooms attribute values greater than 2, that is, 3-∞. Node 603 further represents the full range of view attributes values for node 501. Accordingly, node 603 represents training set listings 1, 2, 8, 9, and 11. Node 603 is a branch node with two child nodes 604 and 605, indicating that the facility proceeded to identify an attribute for splitting node 603, in this case the view attribute. Accordingly, child node 604 represents attribute value ranges of 3 or more bedrooms and no view, and concomitantly listings 1 and 9, each having 3 or more bedrooms and no view, with listing prices $245,000 and $185,000. Node 605 represents attribute value ranges of 3 or more bedrooms and a view (i.e., for the attribute of whether the home has a view, the value "yes"), to which listings 2, 8, and 11 correspond, having listing prices $266,500, $245,000, and $140,000.

In order to apply the completed tree 600 shown in FIG. 6 to obtain an estimated listing price for a distinguished home, the facility accesses the home's attributes. As an example, consider a home having attribute values bedrooms: 5 and view: yes. The facility begins at root node 501. Because node 501 is not a leaf node, the facility proceeds along one of its branches to a child of node 501. In the example, among the available edges 611 and 612, the facility traverses the one whose condition is satisfied by the attributes of the home. Because the value of the bedrooms attribute for the home is 5, the facility traverses edge 612 to node 603. In order to proceed from branch node 603, the facility determines, among edges 613 and 614, which edge's condition is satisfied. Because the home's value of the view attribute is yes, the facility traverses edge 614 to leaf node 605. Having reached a leaf node, the facility here, by way of example, takes an average of the listing prices associated with node 605 and estimates a listing price of $217,000 for the distinguished home. If tree 600 is one tree in a forest of decision trees, the facility in some embodiments aggregates the listing prices represented by leaf node 605 of tree 600 with listing prices represented by the leaf nodes representing the distinguished home by the other trees of the forest, and selects the median as the forest's estimated listing price for the distinguished home.

Those skilled in the art will appreciate that the tree shown in FIG. 6 may not be representative in all respects of trees constructed by the facility. For example, such trees may have a larger number of nodes, a larger depth, and/or a larger branching factor. Also, though not shown in this tree, a single attribute may be split multiple times, i.e., in multiple levels of the tree.

Figure 7:
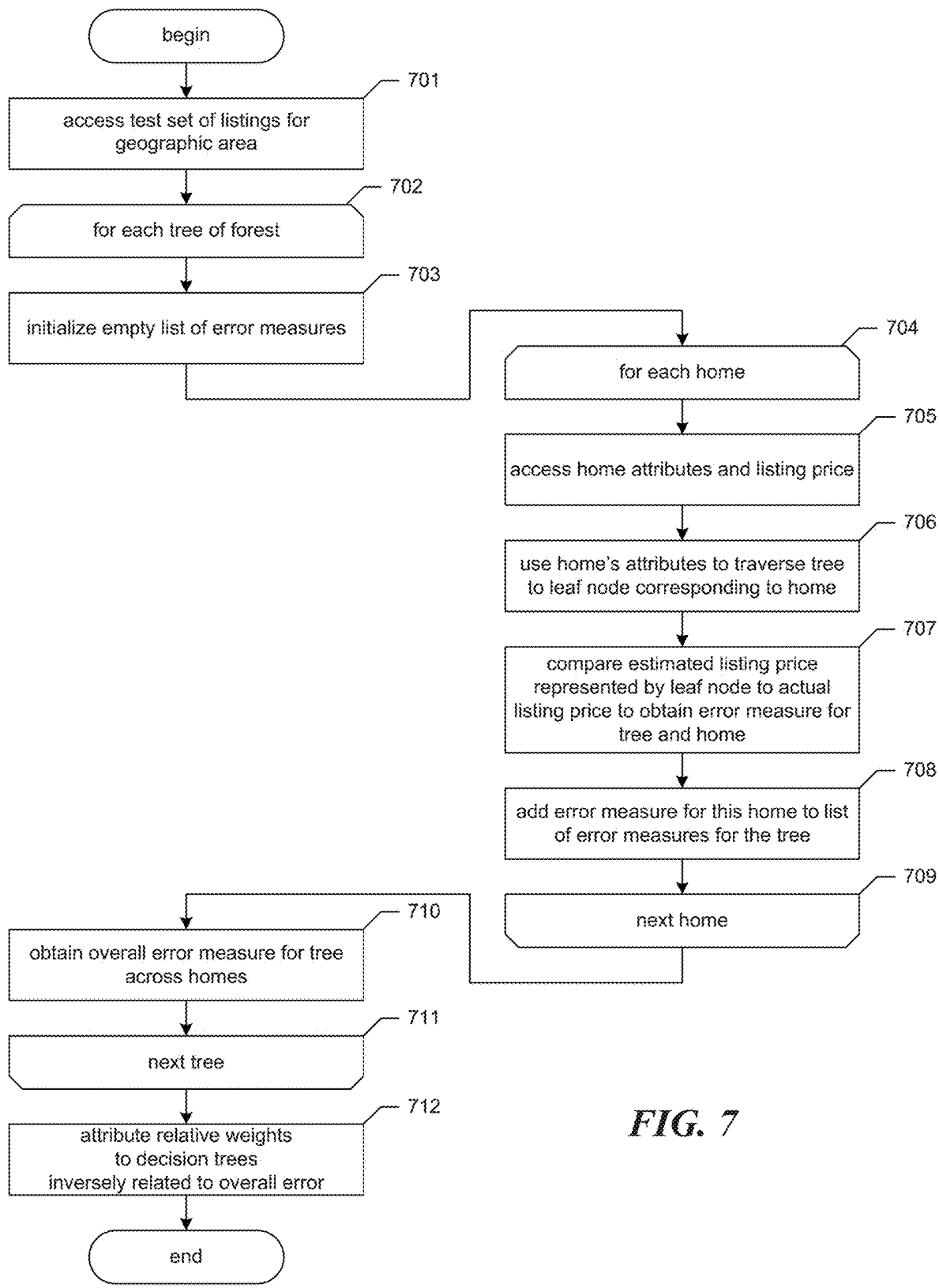
FIG. 7 is a flow diagram showing steps typically performed by the facility in testing and assigning relative weight to trees.

FIG. 7 is a flow diagram showing steps typically performed by the facility in some embodiments in evaluating the efficacy of trees in the forest and assigning corresponding relative weights to the trees. Once a forest of trees has been constructed and trained with a first set of recent listings (a training set) as described above in connection with FIGS. 3-6, the facility in step 701 accesses a distinct second set of listings (a test set) to gauge the accuracy of predictions of each tree in the forest. The facility loops through each tree in the forest in step 702, typically initializing in step 703 a data structure such as a list or array for collecting error measures for the tree's listing price estimations for each home listing in the test set. In steps 704-705, the facility loops through each home listing in the test set and for each home accesses the home's attribute values and actual listing price. In step 706, the facility applies the home's attribute values to the tree in order to reach a leaf node of the tree corresponding to the home and an estimated listing price associated with that leaf node. Steps 705-706 are the same steps the facility would use to apply a tree (such as tree 600 shown in FIG. 6) to the attribute values of a distinguished home to obtain an estimated listing price for the home.

In step 707, the facility compares the estimated listing price for the home determined from the tree's leaf node with the actual listing price for the home accessed in step 705. In some embodiments, the comparison determines the absolute value of the difference between the estimated listing price and the actual listing price, and calculates the magnitude of the estimation's error in relation to the actual listing price by dividing the difference by the actual listing price. In step 708, the resulting error measure for the tree's listing price estimation for the home is added to the list of error measures for the tree, and in step 709 the process is repeated until error measures for the tree's estimations have been collected for each home in the test set. In step 710, the facility obtains an overall error measure for the tree based on the collected error measures for the test set homes. In some embodiments, the overall error measure for the tree is determined by taking an average (e.g., the median value) of the individual error measures calculated from the tree's estimations for the homes in the test set.

In step 711, steps 703-710 are repeated for each tree in the forest, resulting in the facility assigning an overall error measure to each tree. In step 712, the facility accords a relative weight to each tree that is inversely related to the overall error measure for the tree. In this manner, trees that provided more accurate listing price estimates over the test set may be attributed increased likelihood of producing correct estimates. In some embodiments, to determine a particular tree's weighting the facility generates an accuracy metric for each tree by subtracting its median error value from 1, and dividing the tree's accuracy measure by the sum of all of the trees' accuracy measures. In various embodiments, the facility uses a variety of different approaches to determine a rating that is negatively correlated with the tree's overall error measure.

FIG. 8 is a table diagram showing sample results for testing a tree. Tree 1 testing table 800 tests tree 600 based upon the contents of recent listings table 200. More particularly, testing is performed using recent listings that were not used to train the tree. The testing table is thus made up of rows 203, 204, 205, 206, 207, 210, 212, and 214 of recent listings table 200. It also contains the following columns from recent listings table 200: identifier column 221, address column 222, bedrooms column 224, view column 227, and actual listing price column 229. The testing table further contains an estimated listing price column 811 containing the estimated listing price of each home determined in steps 706-707. For example, row 214 shows that the facility determines a listing price of $215,000 for listing 14 using tree 600. To arrive at that determination, the facility begins at root node 501; traverses to node 603 because the number of bedrooms 3 is greater than 2; traverses to node 604 because the value for view is "no;" and adopts the estimated listing price of node 604, $215,000.

Tree 1 testing table 800 further contains an error column 812 indicating the difference between each home's estimated listing price and actual listing price. For example, row 214 shows an error of 0.2874, calculated as the absolute difference between estimated listing price $215,000 and actual listing price $167,000, divided by actual listing price $167,000. Associated with the table is a median error field 851 containing the median of error values in the testing table, or 0.1829. Each tree's median error value is used to determine weightings for the trees that are inversely related to their median error values.

Figure 9:
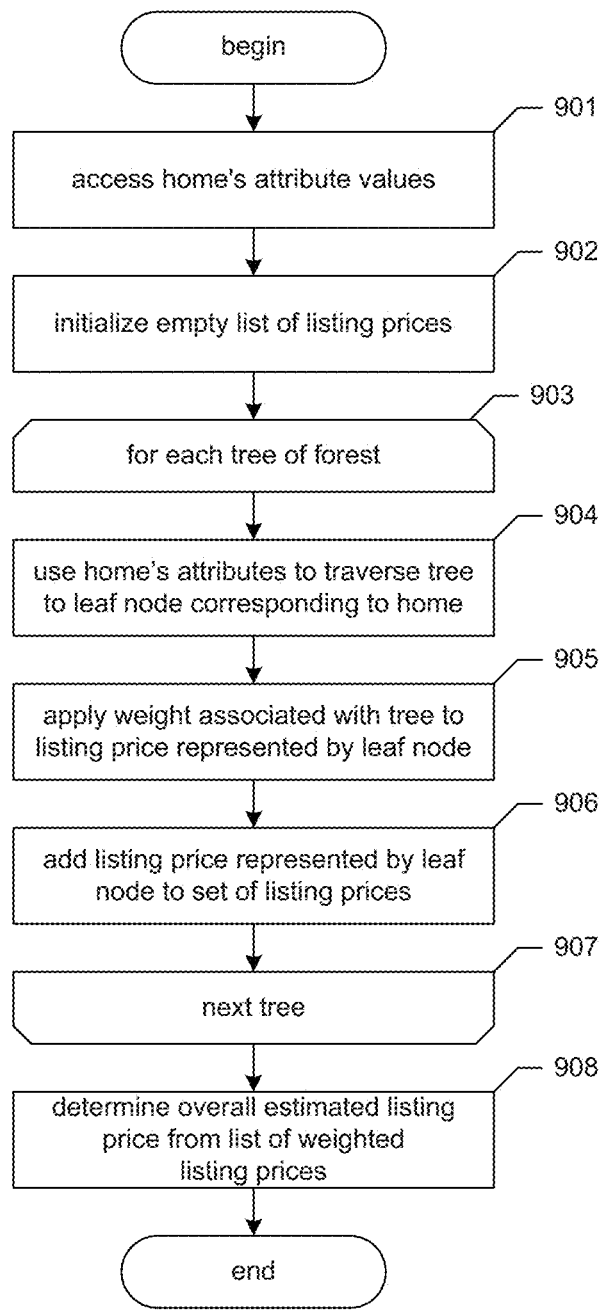
FIG. 9 is a flow diagram showing steps typically performed by the facility in order to apply a forest of trees to estimate a listing price for a home.

FIG. 9 is a flow diagram showing steps typically performed by the facility in some embodiments in order to apply a forest of trees to estimate a listing price for a distinguished home. In step 901, the facility accesses the distinguished home's attribute values. In step 902, the facility typically initializes a data structure such as a list or array for collecting listing price estimations from each tree in the forest. In steps 903-907, the facility loops through each tree in the forest obtaining an estimated listing price for the distinguished home from each tree. In step 904, the facility uses the home's attributes retrieved in step 901 to traverse the tree to a leaf node corresponding to the home's attributes. (If any attributes of the home are missing, the facility typically imputes a value for the missing attribute based upon the median or mode for that attribute in the recent listings table.) The application of a tree to a home in step 904 is performed in the same way that a tree is applied to a home in the testing process described above in connection with FIGS. 7 and 8. In step 905, the estimated listing price associated with the leaf node is weighted by the rating attributed by the facility to the tree. In some embodiments, the weight attributed to the tree in the testing process is already incorporated into the estimated listing price as part of the testing process. In some embodiments, weighting is applied when the estimated listing prices of the trees in the forest are combined. In step 908, the facility determines an overall estimated listing price for the distinguished home by combining the accumulated weighted estimated listing prices obtained by applying each tree in the forest to the home's attribute values. In some embodiments, the weighted estimated listing price from each tree is averaged with the weighted estimated listing prices from the other trees of the forest, and the resultant average is presented as the overall estimated listing price for the home.

FIG. 10 is a table diagram showing sample contents of a recent listings and sales table. The recent listings and sales table 1000 is made up of rows 1001-1015, each representing a home listing and a corresponding sale that occurred in a recent period of time, such as the preceding six months. Each row is divided into the following columns: an identifier column 1021 containing an identifier for the listing and sale; an address column 1022 containing the address of the listed and sold home; a square foot column 1023 containing the floor area of the home; a bedrooms column 1024 containing the number of bedrooms in the home; a bathrooms column 1025 containing the number of bathrooms in the home; a floors column 1026 containing the number of floors in the home; a view column 1027 indicating whether the home has a view; a year column 1028 showing the year in which the home was constructed; a listing date column 1029 showing the date on which the home was listed for sale; a listing price column 1030 containing the listing price at which the home was listed; a sale date column 1031 showing the date on which the home was sold; and a selling price column 1032 containing the selling price at which the home was sold.

For example, row 1011 indicates that for listing-and-sale ID number 11, the home at 87 Acme Boulevard, Williamsburg, VA 23185 having a floor area of 1480 square feet, 3 bedrooms, 2 bathrooms, 2 floors, a view, built in 2002, was listed for sale at $140,000 on Apr. 3, 2012, and sold for $133,000 on Jun. 27, 2012. Though the contents of recent listings and sales table 1000 are included to present a comprehensible example, those skilled in the art will appreciate that the facility can use a recent listings and sales table having columns corresponding to different and/or a larger number of attributes, as well as a larger number of rows. Attributes that may be used include, for example, construction materials, cooling technology, structure type, fireplace type, parking structure, driveway, heating technology, swimming pool type, roofing material, occupancy type, home design type, view type, view quality, lot size and dimensions, number of rooms, number of stories, school district, longitude and latitude, neighborhood or subdivision, tax assessment, attic and other storage, etc. For a variety of reasons, certain values may be omitted from the recent listings and sales table. In some embodiments, the facility imputes missing values using the median value in the same column for continuous variables, or the mode (i.e., most frequent) value for categorical values.

Figure 11A:
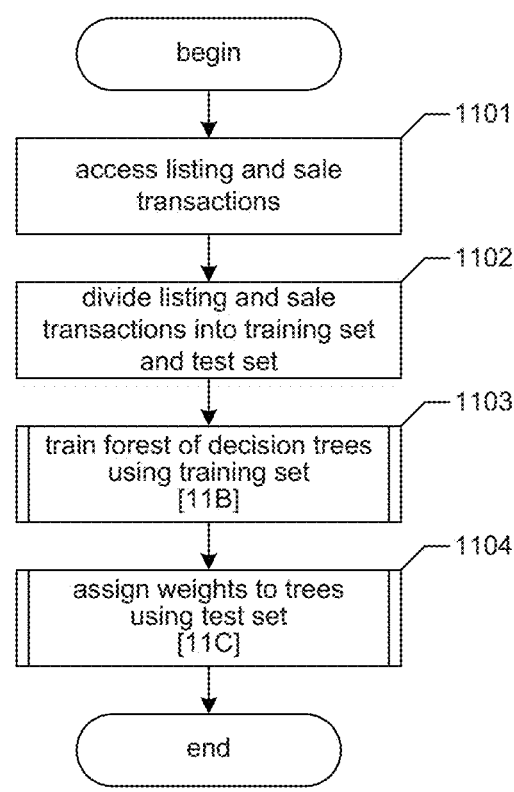
FIGS. 11A-11C are a flow diagram showing steps typically performed by the facility in order to prepare and weight a forest of valuation-estimating decision trees, optionally including the use of synthetic sale prices to train the trees.
Figure 11B:
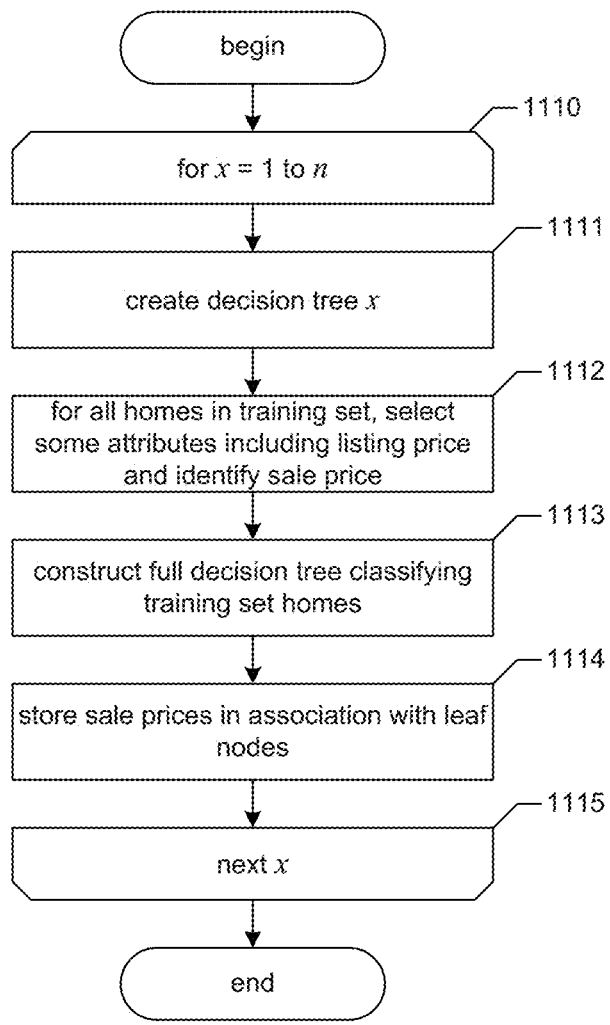
Figure 11C:
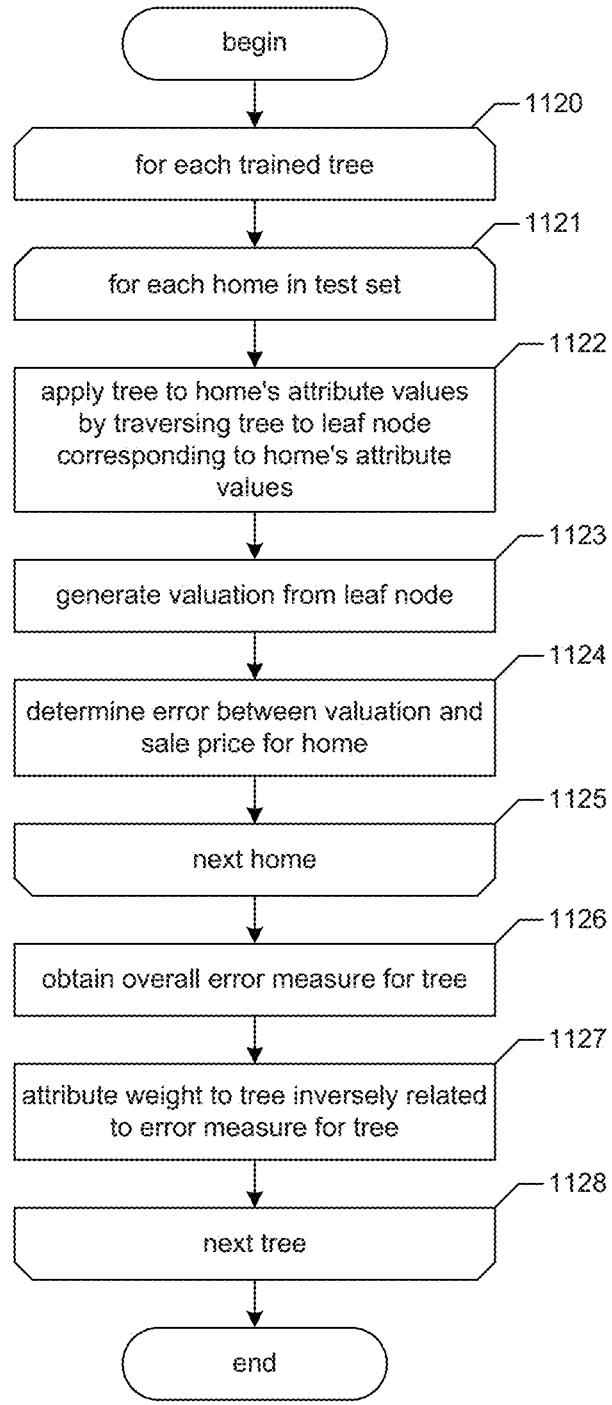

FIGS. 11A-11C are a flow diagram showing steps typically performed by the facility in some embodiments in order to prepare and weight a forest of valuation-estimating decision trees. FIG. 11A is a flow diagram showing a broad outline of the steps performed in building a forest of trained, weighted decision trees that use home attributes including listing prices to generate home valuations. In step 1101, the facility accesses recent listings and sales of homes in a geographic area, comprising home attribute values, listing transactions, and sale transactions. An example of such data is provided in recent listings and sales table 1000 in FIG. 10. In some embodiments, accessing recent listings and sales includes filtering the data to exclude bad data or outlier data. In some embodiments, portions of the data used to train the trees are listings data for homes that have been listed for sale, for which synthetic sale prices have been generated as discussed in greater detail below in connection with FIGS.

12 and 14. In step 1102, the facility divides the listing and sale transactions into two distinct sets: a first set of home listings and sales data for training a valuation model (a training set) and a second, distinct set of home listings and sales data for testing and weighting the valuation model (a test set). In step 1103, the facility trains, using the training set, a forest of decision trees to estimate home valuations from the homes' attribute values and listing prices. Step 1103 is discussed in greater detail below in connection with FIG. 11B. In step 1104, the facility tests, using the test set, the accuracy of the decision trees' estimations and assigns weights to the trees of the forest in order to improve the quality of home valuation estimates. Step 1104 is discussed in greater detail below in connection with FIG. 11C.

FIG. 11B is a flow diagram showing steps typically performed by the facility in some embodiments in order to create and train a forest of decision trees to estimate home valuations from home attribute values and listing prices. In steps 1110-1115, the facility constructs and trains a number n of trees, such as 100. This number is configurable, with larger numbers typically yielding better results but requiring the application of greater computing resources. In step 1111, the facility constructs a new tree (i.e., a root node). In step 1112, the facility selects a subset of the attributes in the training set home listing and sale data, including listing price, and identifies the sale price, as a basis for training the tree. In step 1113, the facility fully constructs (i.e., trains) the tree to classify the training set home data using the subset of attributes including listing price selected in step 1112, resulting in a trained tree that can be used to estimate a home valuation from home attributes including a listing price. (The process of creating and training a home valuation-estimating decision tree is analogous to the process of creating and training a home listing-price-estimating decision tree described above in connection with FIG. 3.) Once the tree has been fully constructed, each leaf node represents a range of home attribute values including listing prices, such that each home in the training set corresponds to exactly one leaf node. In step 1114, the facility stores, in association with the leaf nodes, the sale prices of the training set homes that correspond to the attribute value ranges of each leaf node. The facility after step 1115 has created a forest of n trained but un-tested and non-weighted decision trees.

FIG. 11C is a flow diagram showing steps typically performed by the facility in some embodiments in testing and assigning relative weight to the trees of the forest created and trained as described in connection with FIG. 11B. (The process of testing and weighting a forest of home valuation-estimating decision trees is analogous to the process of testing and weighting a forest of home listing-price-estimating decision trees described above in connection with FIG. 7.) In step 1120, the facility iterates through each tree in the forest, performing steps 1121-1127 for each tree. In step 1121, the facility loops through each home listing and sale entry in the test set, and accesses the home's attribute values including listing price, and its sale price. In step 1122, the facility applies the home's attribute values to the tree, traversing the tree to a leaf node corresponding to the home's attribute values and its listing price. In step 1123, the facility generates an estimated home valuation associated with that leaf node. (Steps 1122-1123 are the same steps the facility would use to apply a home valuation-estimating tree to the attribute values and listing price of a distinguished home to obtain a valuation for the home, as discussed in further detail below in connection with FIG. 12.) In step 1124, the facility compares the estimated valuation for the home as generated in step 1123 with the sale price for the home contained in the test set data, and determines an error measure (e.g., the absolute difference divided by the sale price) for the estimation by that tree for that home. In step 1125, the facility performs the same steps for each home listing and sale entry in the test set, recording the error measures for each home for that tree. In step 1126, the facility obtains an overall error measure for the tree based on the collected error measures for the test set homes. In step 1127, the facility attributes a weight to the tree inversely related to the tree's overall error measure. In step 1128, the facility repeats steps 1121-1127 for each tree, resulting in a forest of trained, weighted decision trees that use a home's attributes and listing price to generate a home valuation.

Figure 12:
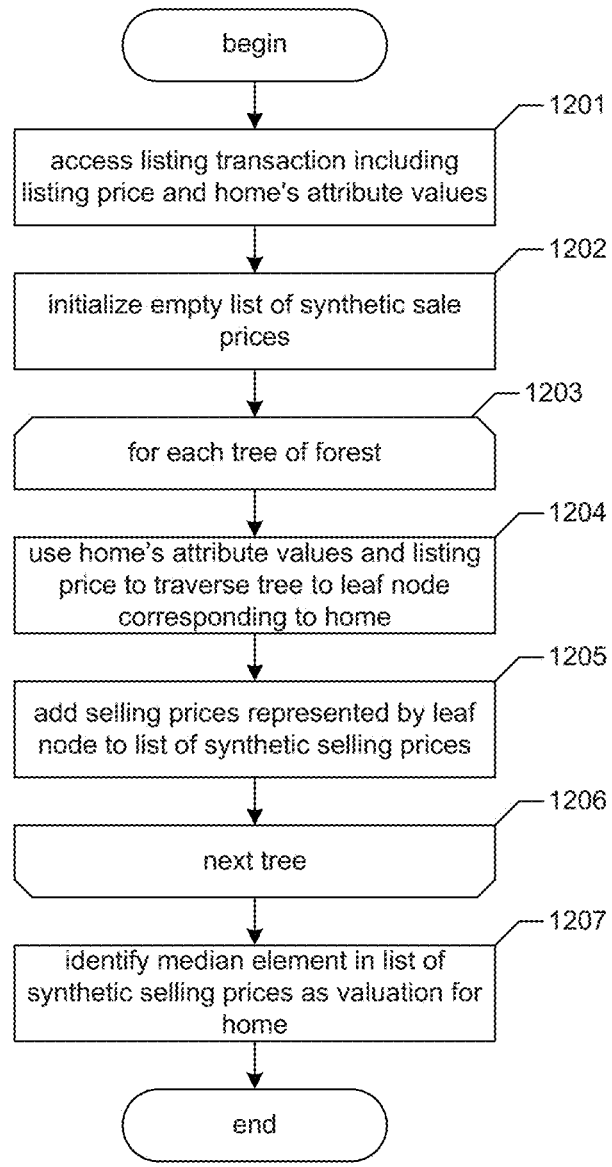
FIG. 12 is a flow diagram showing steps typically performed by the facility in order to apply a forest of trees to generate a synthetic sale price for a home.

FIG. 12 is a flow diagram showing steps typically performed by the facility in some embodiments in order to apply a forest of trees to generate a synthetic sale price for a home. In step 1201, the facility accesses a home listing transaction including home attribute values and a listing price for a distinguished home. In step 1202, the facility initializes a data structure such as a list or array for collecting synthetic sale price estimations from each tree in the forest. In steps 1203-1206, the facility iterates through each tree in a forest of decision trees that use home attributes and a listing price to generate a home valuation. In step 1204, the facility applies a tree to the home's attribute values and listing price, traversing the edges of the tree graph to reach the leaf node whose range of encompassed attribute values and listing prices corresponds to the home's attribute values and listing price. In step 1205, the valuation or selling prices associated with that leaf node are added to the data structure that was initialized in step 1202 for collecting sale price estimations. After applying each tree in the forest to the distinguished home in step 1206, the data structure has collected valuations for the home from each tree. In step 1207, the facility generates a synthetic sale price for the distinguished home based on the collected valuations. In some embodiments, the home's overall synthetic sale price is generated by identifying the median element in the list of synthetic sale prices generated by the trees of the valuation-estimating decision tree forest.

FIG. 13 is a table diagram showing sample contents of a recent listings table including synthetic sale prices. The recent listings and sales table 1300 is made up of rows 1301-1315, each representing a home listing that occurred in a recent period of time, such as the preceding six months, and a corresponding synthetic sale price. Each row is divided into the following columns: an identifier column 1321 containing an identifier for the listing and synthetic sale; an address column 1322 containing the address of the listed home; a square foot column 1323 containing the floor area of the home; a bedrooms column 1324 containing the number of bedrooms in the home; a bathrooms column 1325 containing the number of bathrooms in the home; a floors column 1326 containing the number of floors in the home; a view column 1327 indicating whether the home has a view; a year column 1328 showing the year in which the home was constructed; a listing price column 1329 containing the listing price at which the home was listed; a date column 1330 showing the date on which the home was listed for sale; and a synthetic sale price column 1331 containing the synthetic sale price generated for the home.

For example, row 1306 indicates that for listing number 6, the home at 1135 Eighth Avenue North, Williamsburg, VA 23185 having a floor area of 2300 square feet, 2 bedrooms, 2 bathrooms, 1 floor, no view, built in 1966, was listed for sale at $239,000 on Feb. 22, 2012, and was accorded a synthetic sale price of $232,000. Though the contents of recent listings and synthetic sales table 1300 are included to present a comprehensible example, those skilled in the art will appreciate that the facility can use a recent listings and synthetic sales table having columns corresponding to different and/or a larger number of attributes, as well as a larger number of rows. For a variety of reasons, certain values may be omitted from the recent listings and sales table. In some embodiments, the facility imputes missing values using the median value in the same column for continuous variables, or the mode (i.e., most frequent) value for categorical values.

Figure 14:
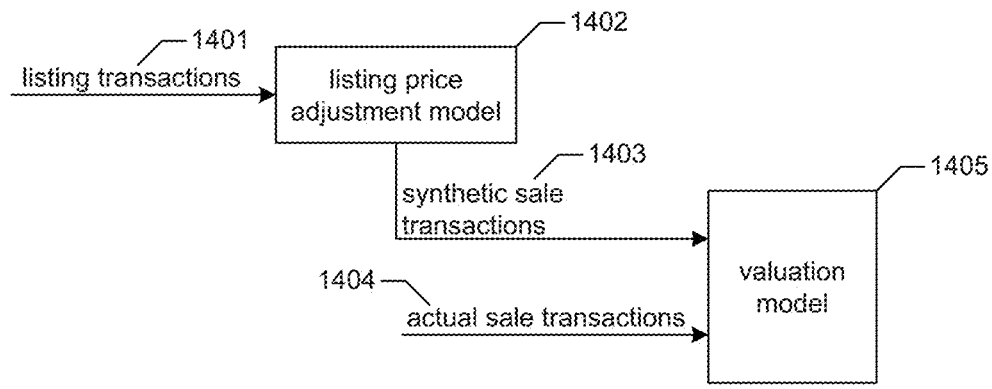
FIG. 14 is a data flow diagram showing a typical process used by the facility in some embodiments to train a home valuation model using data from both actual sale transactions and synthetic sale transactions generated by a listing price adjustment model.

FIG. 14 is a data flow diagram showing a typical process used by the facility in some embodiments to train and/or test a home valuation model using data from both actual sale transactions and synthetic sale transactions generated by a listing price adjustment model. Listing transactions 1401 are provided to a listing price adjustment model 1402, which uses the data to generate synthetic sale transactions 1403. Both synthetic sale transactions 1403 and actual sale transactions 1404 are used to train and/or test a valuation model 1405. The valuation model 1405 is then able to produce valuations for homes based in part on synthetic sale data.

Figure 15:
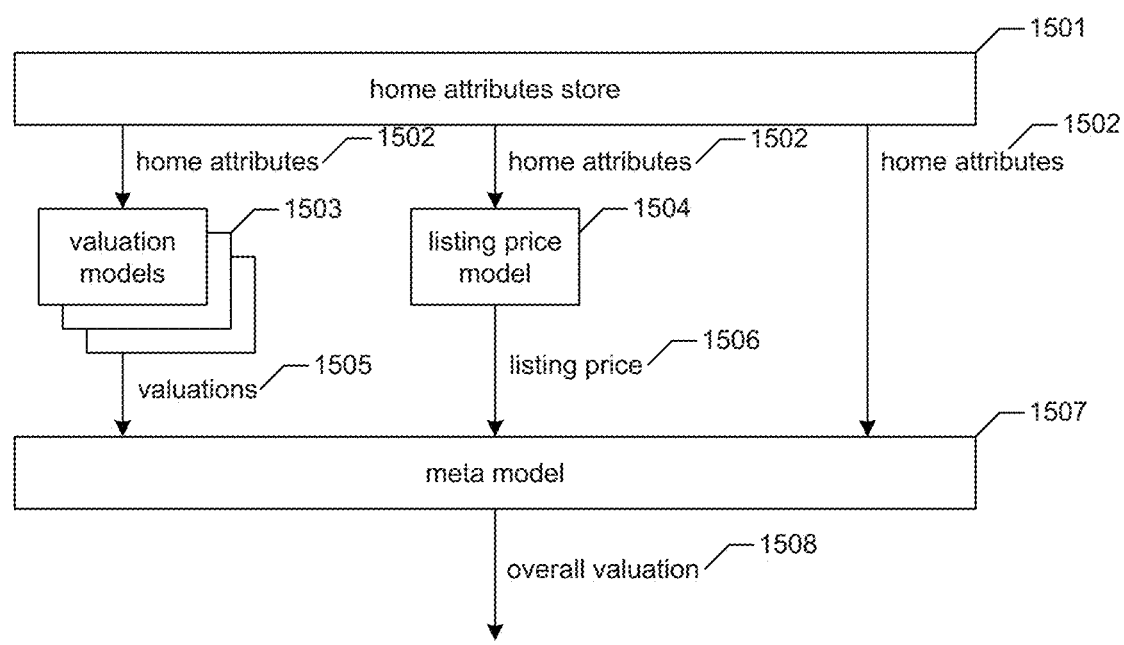
FIG. 15 is a data flow diagram showing a typical process used by the facility in some embodiments to apply a complex valuation model to value a home.

FIG. 15 is a data flow diagram showing a typical process used by the facility in some embodiments to apply a complex valuation model to value a home. A home attributes store 1501 is shown, from which attributes 1502 of a home are provided to various valuation models 1503 that produce valuations 1505. Among the valuation models 1503 in some embodiments is a valuation model trained and/or tested on synthetic sale data. The home attributes 1502 are also provided from the home attributes store 1501 to a listing price model 1504, which produces a listing price 1506. The home attributes 1502 are also provided from the home attributes store 1501 to a meta model 1507, which uses the home attributes 1502 in determining how to combine valuation inputs 1505 from various valuation models 1503 and listing price 1506 from listing price model 1504. The meta model applies various techniques such as input weighting, bias correction, data smoothing, and confidence interval estimation in producing an overall valuation 1508. Further details describing steps typically performed by the facility in connection with a meta model may be found in U.S. patent application Ser. No. 13/417,804, entitled "Automatically Determining a Current Value for a Home," filed Mar. 12, 2012, which is fully incorporated herein by reference.

Figure 16:
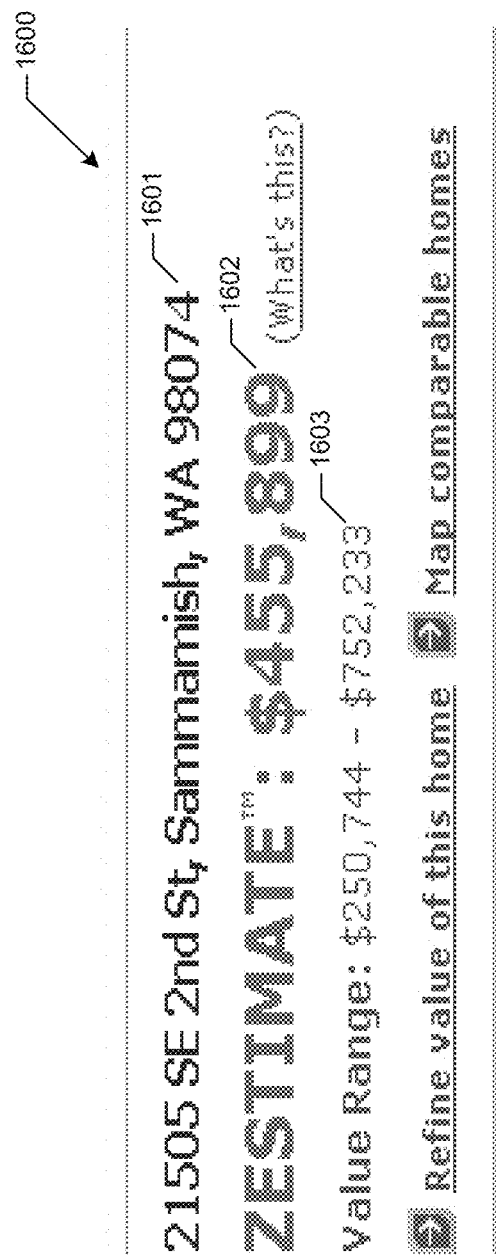
FIG. 16 is a display diagram showing information about an individual home.

FIG. 16 is a display diagram showing a way in which information about an individual home including a valuation generated by the facility may be presented. The display 1600 includes information 1601 about the home. Despite the fact that the home has not been sold recently, the facility also displays a valuation 1602 and a confidence interval of valuation estimates 1603 for the home, enabling prospective buyers and listing agents to gauge their interest in the home, or permitting the home's owner to gauge his or her interest in listing the home for sale.

FIG. 17 is a table diagram showing sample contents of a recent listings history table. The recent listings table 1700 is made up of rows 1701-1705, each representing a home listing that was active during a recent period of time, such as the preceding six months. Each row is divided into the following columns: an identifier column 1721 containing an identifier (e.g., the multiple listing service (MLS) listing number) for the listing; an address column 1722 containing the address of the listed home; a listing price column 1723 containing the listing price at which the home was listed; a listing date column 1724 showing the date on which the home was listed; an listing end date column 1725 showing the date on which the home listing ended; a days on market column 1726 showing the duration of the listing (i.e., the length of dime from the listing date to the end date [or to the current date, for an active listing]); an end reason column 1727 containing a classification of the reason that the listing ended; and a relisting/sale price column 1728 showing the price at which the listed home was sold or relisted, where applicable.

For example, row 1701 indicates that listing number 1, of the home at 15 W High Drive, Spokane, WA 99203, was for $800,000, started on Apr. 5, 2012, and ended on Aug. 16, 2012, after 133 days on market, when it was relisted at a lower price of $710,000. Row 1703 indicates that listing number 3, of the same home for $710,000, began on Aug. 16, 2012, and ended after 55 days with a sale for $695,000 on Oct. 10, 2012. Row 1705 represents a recent, active listing. In some embodiments, the facility excludes active listings listed more recently than some minimum threshold (e.g., within the past two months) from home listing event training or testing data sets. For training or testing data purposes, the facility may treat a pending sale as a sale. In some embodiments, the facility applies survival analysis to non-excluded active listings.

Though the contents of recent listings table 1700 are included to present a comprehensible example, those skilled in the art will appreciate that the facility can use a recent listings history table having columns corresponding to different and/or a larger number of data categories (e.g., a cross-reference to a data table containing home attribute values), as well as a larger number of rows.

Figure 18A:
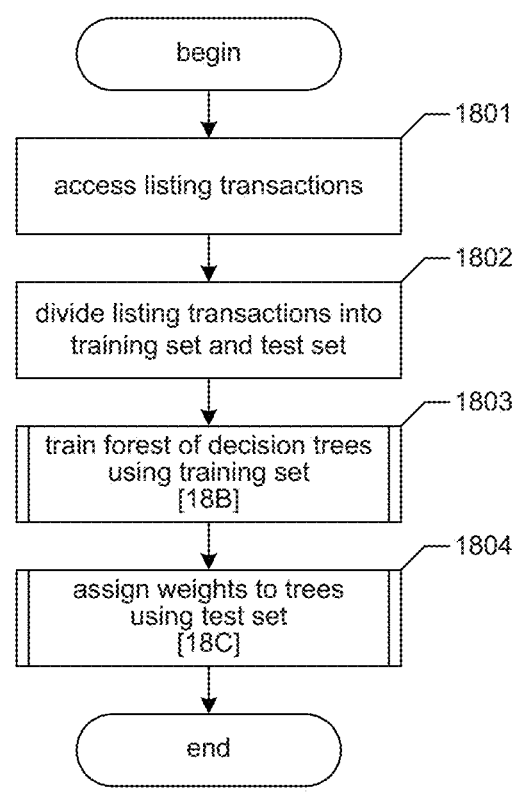
FIGS. 18A-18C are flow diagrams showing steps typically performed by the facility in some embodiments to train and test a forest of time-on-market-estimating decision trees.
Figure 18B:
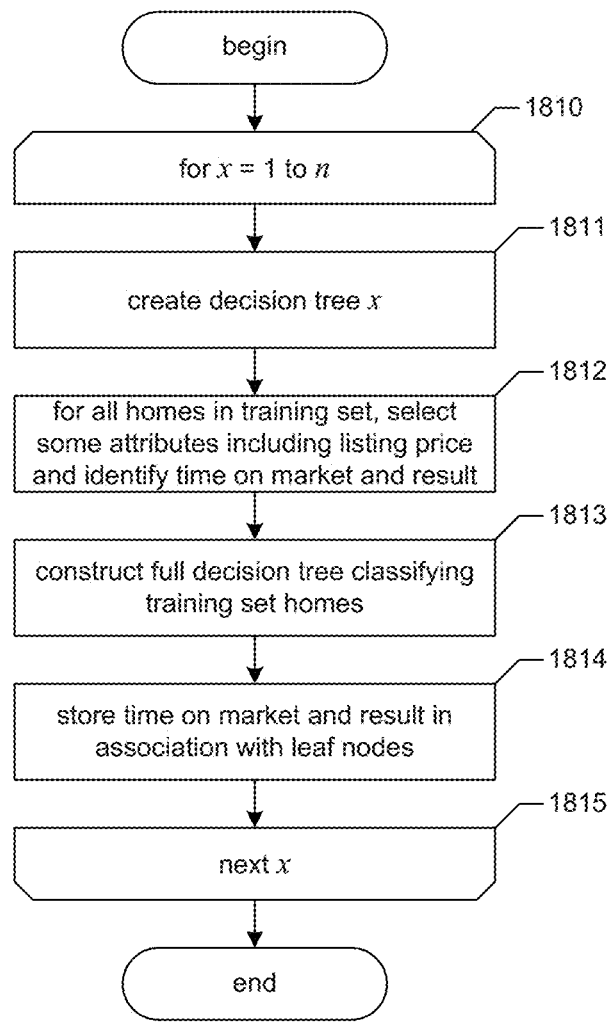
Figure 18C:
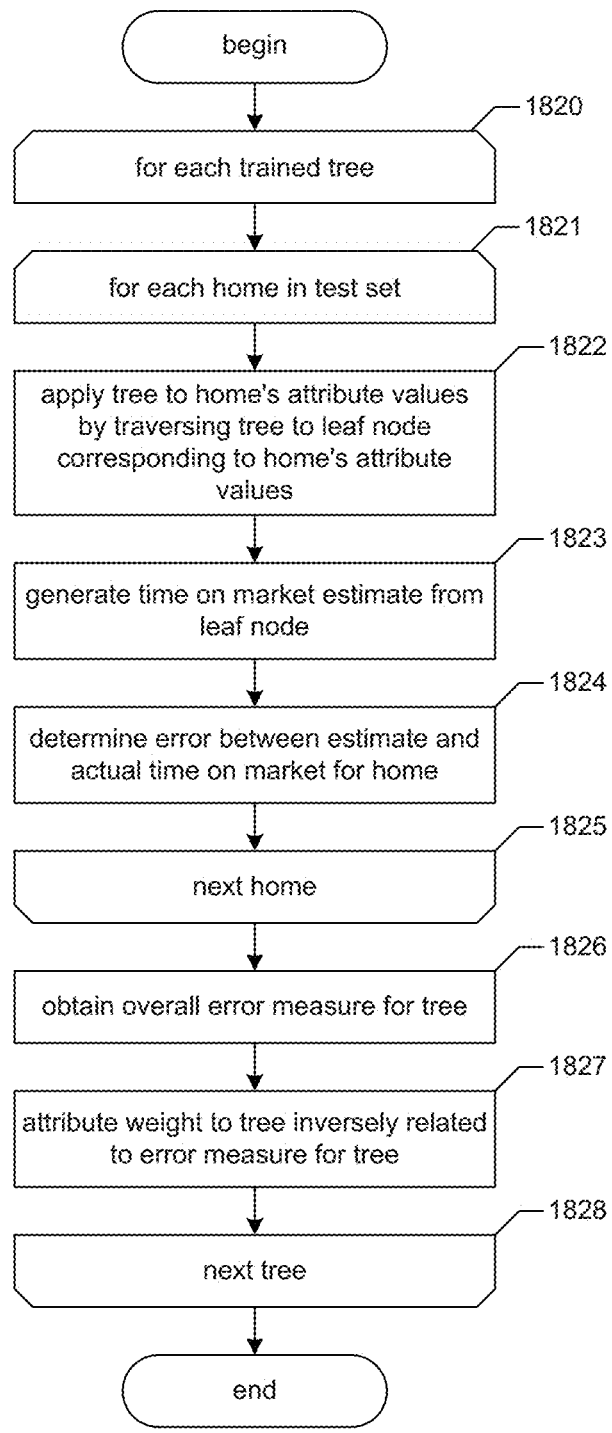

FIGS. 18A-18C are flow diagrams showing steps typically performed by the facility in some embodiments to train and test a forest of time-on-market-estimating decision trees. FIG. 18A is a flow diagram showing a broad outline of the steps performed by the facility to build a model (here, a forest of trained, weighted decision trees) that uses home attributes including listing prices to generate time on market estimations. In step 1801, the facility accesses recent listings of homes in a geographic area, comprising home attribute values and listing transactions. An example of such listing transaction data is provided in recent listings history table 1700 in FIG. 17. (Home attribute data, e.g., a separate table of attribute values for each listed home, is not shown here. Attributes may include synthetic home attributes, e.g., an ascribed valuation, imputed home information, previous listing price and duration information, or cumulative days on the market over a series of listings.) In some embodiments, accessing recent listings includes filtering the data to exclude bad data or outlier data, or, e.g. (as described above in connection with FIG. 17), recent active listing transactions.

In step 1802, the facility divides the listing transactions into two distinct sets: a first set of home listing data for training a time on market estimation model (a training set) and a second, distinct set of home listing data for testing and weighting the time on market estimation model (a test set). In step 1803, the facility trains, using the training set, a forest of decision trees to produce time on market estimates from the homes' attribute values and listing prices. Step 1803 is discussed in greater detail below in connection with FIG. 18B. In step 1804, the facility tests, using the test set, the accuracy of the decision trees' estimations and assigns weights to the trees of the forest in order to improve the quality of time on market estimates. Step 1804 is discussed in greater detail below in connection with FIG. 18C. (It will be appreciated by those skilled in the art that the same steps described in FIGS. 18A-18C may be used to train and test a forest of decision trees to predict, for homes in a geographic area with home attributes including listing price, their likelihood of sale within a given time period.)

FIG. 18B is a flow diagram showing steps typically performed by the facility in some embodiments in order to create and train a forest of decision trees to estimate time on market from home attribute values and listing prices. In steps 1810-1815, the facility constructs and trains a number n of trees, such as 100. This number is configurable, with larger numbers typically yielding better results but requiring the application of greater computing resources. In step 1811, the facility constructs a new tree (i.e., a root node). In step 1812, the facility selects a subset of the attributes in the training set home listing data, including listing price, and identifies the length of time each listing was on the market and whether the result was a sale, as a basis for training the tree. In step 1813, the facility fully constructs (i.e., trains) the tree to classify the training set home data using the subset of attributes including listing price selected in step 1812, resulting in a trained tree that can be used to estimate the time a home might remain unsold on the market from home attributes including a listing price. (The process of creating and training a time-on-market-estimating decision tree is analogous to the process of creating and training a home listing-price-estimating decision tree described above in connection with FIG. 3, and to the process of creating and training a home valuation-estimating decision tree described above in connection with FIG. 11B.) Once the tree has been fully constructed, each leaf node represents a range of home attribute values including listing prices, such that each home in the training set corresponds to exactly one leaf node. In step 1814, the facility stores, in association with the leaf nodes, the times on market and the listing end results (e.g., a sale at some price, relisting, or withdrawal from the market) of each of the training set homes that correspond to the attribute value range of each leaf node. The facility after step 1815 has created a forest of n trained but un-tested and non-weighted decision trees.

FIG. 18C is a flow diagram showing steps typically performed by the facility in some embodiments in testing and assigning relative weight to the trees of the forest created and trained as described in connection with FIG. 18B. (The process of testing and weighting a forest of time-on-market-estimating decision trees is analogous to the process of testing and weighting a forest of home listing-price-estimating decision trees described above in connection with FIG. 7, and to the process of testing and weighting a forest of home valuation-estimating decision trees described above in connection with FIG. 11C.) In step 1820, the facility iterates through each tree in the forest, performing steps 1821-1827 for each tree. In step 1821, the facility loops through each home listing entry in the test set, and accesses the home's attribute values including listing price, and its time on market and what the end result of the listing was (e.g., a sale at some price, relisting, or withdrawal from the market). In step 1822, the facility applies the home's attribute values to the tree, traversing the tree to a leaf node corresponding to the home's attribute values including its listing price. In step 1823, the facility generates a time on market estimate associated with that leaf node. (Steps 1822-1823 are the same steps the facility would use to apply a time-on-market-estimating tree to the attribute values and listing price of a distinguished home to obtain a time on market estimation for the home, as discussed in further detail below in connection with FIG. 19.)

In step 1824, the facility compares the time on market estimate for the home as generated in step 1823 with the actual time on market for the home contained in the test set data, and determines an error measure (e.g., the absolute difference divided by the actual time on market) for the estimation by that tree for that home. In step 1825, the facility performs the same steps for each home listing and sale entry in the test set, recording the error measures for each home for that tree. In step 1826, the facility obtains an overall error measure for the tree based on the collected error measures for the test set homes. In step 1827, the facility attributes a weight to the tree inversely related to the tree's overall error measure. In step 1828, the facility repeats steps 1821-1827 for each tree, resulting in a forest of trained, weighted decision trees that use a home's attributes and listing price to generate a time on market estimate, i.e., an estimate of the number of days that the home will remain unsold when listed for sale at the listing price in the market on which the model was based.

Figure 19:
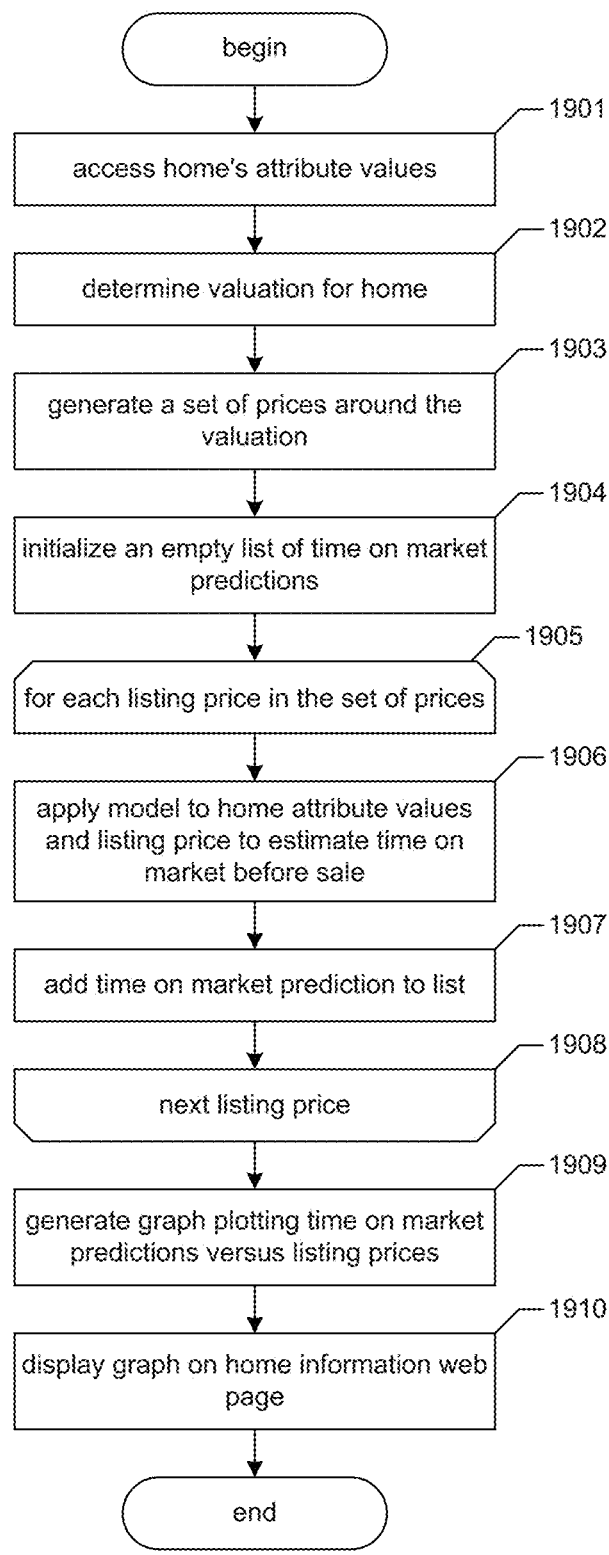
FIG. 19 is a flow diagram showing steps typically performed by the facility in order to display a graph of estimated time on market for a home at various listing prices.

FIG. 19 is a flow diagram showing steps typically performed by the facility to display a graph of estimated time on market for a home at various listing prices. In step 1901, the facility accesses the home's attribute values. The facility determines a valuation for the home, e.g., by applying a valuation model as discussed in greater detail above, in step 1902. In step 1903, the facility generates a set of listing prices. A user may specify one or more listing prices, or the facility may choose prices based on various criteria (e.g., likely listing prices, based on the home's attribute values, the valuation, and the market, or based on a listing price estimation model). The listing prices need not be evenly distributed around the valuation and may not be based on the valuation. In step 1904, the facility initializes a data structure such as a list or array for collecting estimated time on market predictions. In steps 1905-1908, the facility iterates through each listing price in the set of generated listing prices and determines an estimated time on market for each listing price. In step 1906, the facility applies a model applicable to the home's attribute values, geographic area, and market conditions (for example, a model trained and tested as described above in connection with FIGS. 18A-18C) to estimate a length of time the home would remain on the market if listed for sale at the selected listing price. In step 1907, the model's prediction is added to the data structure that was initialized in step 1904. In steps 1909-1910, the facility generates and displays a graph plotting the expected length of time the home would remain listed on the market for each selected listing price.

Figure 20:
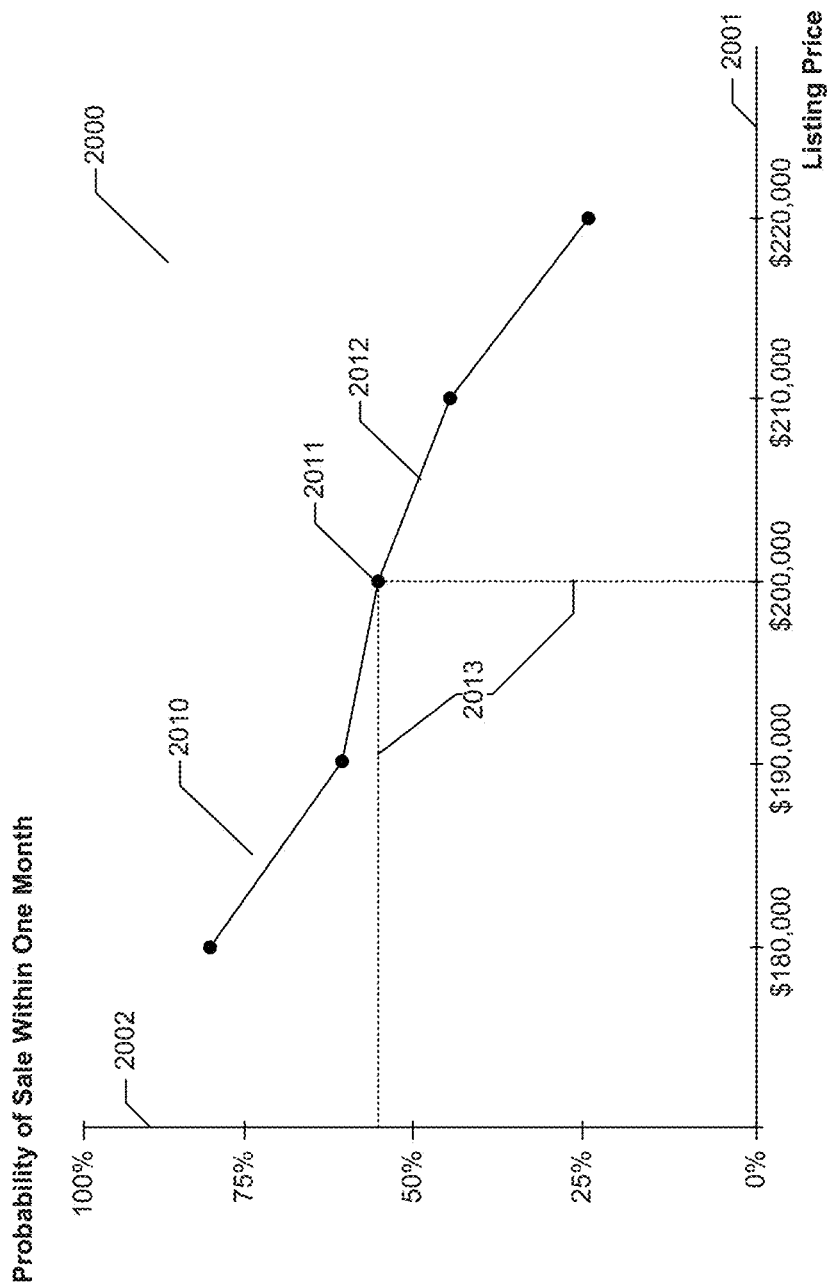
FIG. 20 is a display diagram showing a graph of listing price and probability of sale.

FIG. 20 is a display diagram showing a line graph of probability of sale for different listing prices for a particular home. The graph 2000 has a horizontal axis (x-axis) 2001 labeled "Listing price" that displays a scale of listing prices. In this example, the displayed range of listing prices is approximately $170,000-$230,000. The facility provides a user control to modify the scale or range of displayed listing prices (e.g., with a zoom control, a slider, or a gesture on a touch screen) to focus on a portion of the graph or to see a wider range of values. The graph 2000 also has a vertical axis (y-axis) 2002 labeled "Probability of sale within one month" that displays a scale of percentages. In this example, the displayed range of percentages is the full range of 0%-100%. Just as with the horizontal axis, the facility provides a user control to display a portion of the range, either together with or independent of the other axis; it also provides a user control to vary the period (e.g., to show probability of sale within one week, or within 90 days). A segmented line 2010 plots data points (e.g., a point 2011 illustrating a sale probability of approximately 55% for the particular home at a listing price of $200,000, as indicated by the dashed lines 2013) connected by line segments (e.g., segment 2012) illustrating probability trends between data points.

In some embodiments, the facility determines the probability of sale of the subject home during the specified time for each of the listing prices shown in FIG. 20 by: (1) for each tree of the forest, (a) selecting the leaf node corresponding to the home's attributes and listing price, and (b) determining the percentage of sale transactions assigned to the selected leaf that sold in no greater than of the specified amount of time; and (2) aggregating these percentages across the trees of the forest, where the aggregation is weighted using the efficacy weight assigned to each tree. In some embodiments, the facility trains and applies a specialized probability of sale model to obtain the probability shown in FIG. 20.

Figure 21:
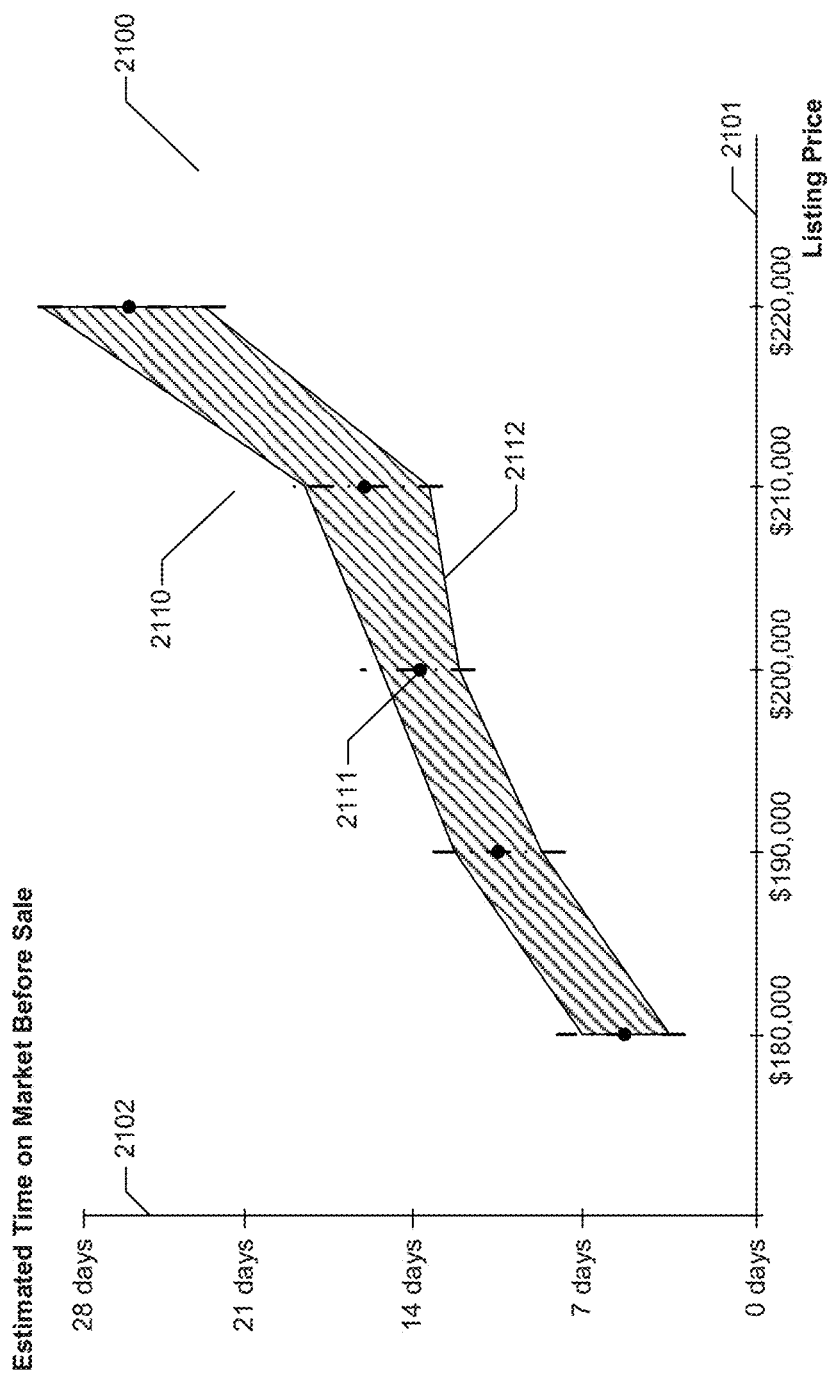
FIG. 21 is a display diagram showing a graph of listing price and time on market.

FIG. 21 is a display diagram showing a graph of time on market for different listing prices. The graph 2100 has a horizontal axis (x-axis) 2101 labeled "Listing price" that displays a scale of listing prices. In this example, the displayed range of listing prices is approximately $170,000-$230,000. As described above in connection with FIG. 20, the facility provides a user control to modify the scale or range of displayed listing prices. The graph 2100 also has a vertical axis (y-axis) 2102 labeled "Estimated time on market before sale" that displays a scale of days. In this example, the displayed range of days is 0 days-28 days. Just as with the horizontal axis, the facility provides a user control to zoom in or out to display a smaller or larger portion of the range, either together with or independent of the other axis. A confidence band line 2110 plots data points (e.g., a point 2111 illustrating an expected time to sale of approximately 14 days for the particular home at a listing price of $200,000) with vertical confidence bars above and below the data points (e.g., illustrating that the home might be expected to sell between 11 and 17 days from its listing date) and line segments (e.g., segment 2112) illustrating confidence bands.

Figure 22:
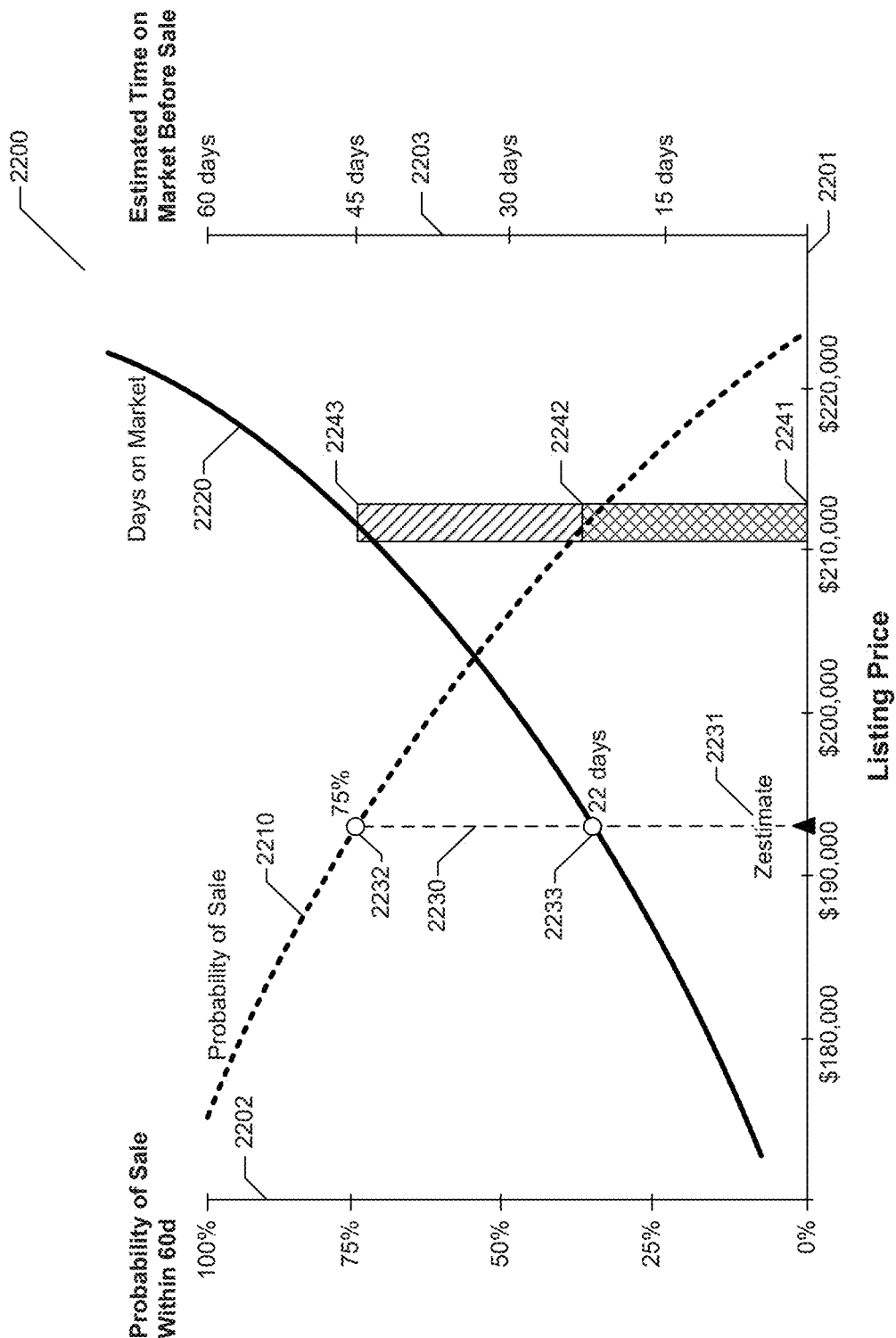
FIG. 22 is a display diagram showing a combined graph of listing price and both probability of sale and time on market.

FIG. 22 is a display diagram showing a dual-scaled combined graph of both probability of sale and time on market for different listing prices. The graph 2200 has a horizontal axis (x-axis) 2201 labeled "Listing price" that displays a scale of listing prices. In this example, the displayed range of listing prices is approximately $170,000-$230,000. As described above in connection with FIG. 20, the facility provides a user control over the displayed scale or range of displayed listing prices. The graph 2200 also has a left vertical axis (left y-axis) 2202 labeled "Probability of sale within 60d" that displays a percentage scale. In this example, the displayed percentage range is the full range of 0%-100%. The graph 2200 also has a right vertical axis (right y-axis) 2203 labeled "Estimated time on market before sale" that displays a scale of days. In this example, the displayed range of days is from 0 days to approximately 70 days. Just as with the horizontal axis, the facility provides a user control to zoom in to display a portion of either vertical range, together with or independent of one or both of the other axes. A line 2210 plots a smooth curve illustrating sale probabilities for the particular home at various listing prices, in relation to left vertical axis 2202. Another line 2220 plots a smooth curve illustrating estimated days on market for the particular home at various listing prices, in relation to right vertical axis 2203. A vertical line 2230 indicates, for a listing price equal to a home valuation 2231, an estimated 75% likelihood of sale within sixty days 2232 and an estimated 22-day time on market 2233. Bars 2242 and 2243 illustrate, for a different listing price 2241, an estimated 38% likelihood of sale within sixty days 2242 and an estimated 45-day time on market 2243.

In some embodiments, the facility performs bucketizing and/or other kinds of smoothing to remove artifacts from the graphs before it displays them. In some embodiments, the facility separately analyzes and determines trends in the graph that occur above and below a listing price corresponding to an automatically-determined estimate of the subject home's value.

In some embodiments, rather than using a monolithic random forest model to predict time on market and/or likelihood of sale based on home attributes and listing price, the facility uses a compound model made up of two constituent models: (1) a random forest that predicts the probability of sale or time on the market at each home's automatically-estimated current value, and (2) an adjustment model that predicts the degree of variation from the results produced by the random forest constituent model based upon the ratio of home listing price to estimated value. In various embodiments, the facility uses an adjustment model of various types, such as a linear regression model or a K-nearest neighbor model. For example, in some embodiments using a K-nearest neighbor adjustment model, the facility (1) collects the sale transactions in a relevant geographic area, such as a county, during a relevant time period, such as the last year; (2) for each sale transaction in the collection, computes the ratio of listing price to the home's estimated value; (3) discards sale transactions from the collection whose computed ratios identify them as outliers, such as the sale transactions having the top and bottom 5% of ratios, sale transactions whose ratios are more than the threshold distance from an aggregate of the ratios such as mean or median, etc.; (4) among the remaining sale transactions in the collection, selecting those whose home attributes are the most similar to those of the subject home including such attributes as, for example, number of bedrooms, number of bathrooms, latitude and longitude, assessed value, etc.; and (5) determining an adjustment factor on the basis of these nearest neighbors. In some embodiments, the facility uses a number of nearest neighbors between 25 and 100. In some embodiments, rather than selecting nearest neighbors for the subject home, the facility uses all of the undiscarded sale transactions in the geographic area. In some embodiments, the facility uses home estimated value tiers to determine the adjustment factor, such as tiers comprising the top, middle, and bottom third of automatically-estimated values within the geographic area. In some embodiments, the facility combines all of the homes in the geographic area into a single tier.

CONCLUSION

It will be appreciated by those skilled in the art that the above-described facility may be straightforwardly adapted or extended in various ways. For example, the facility may use a wide variety of modeling techniques, house attributes, and/or data sources. The facility may display or otherwise present its valuations in a variety of ways. While the foregoing description makes reference to particular embodiments, the scope of the invention is defined solely by the claims that follow and the elements recited therein.

We claim:

1. A method in a computer system having a processor to train a model for estimating a length of time from listing a home for sale at a listing price to sale of the home, using home listing transactions and a result of the home listing transactions, the method comprising:
  accessing, for each of a first plurality of homes that were listed for sale, values of attributes for the home including the listing price at which the home was listed for sale, and listing information including a length of time the home was on a real estate market and the result of the home listing transactions;
  creating, by the processor, a model for estimating a time from listing to sale;
  training the model, using the values of the attributes and the accessed listing information, such that the model is generates an estimated length of time from listing to sale of a distinguished home based on the values of the attributes for the distinguished home and the listing price for the distinguished home, wherein training the model further comprises:
    collecting a plurality of sale transactions in a geographic area, each of the plurality of sale transactions having a subject home,
    for each of the plurality of sale transactions in the geographic area, computing a ratio of listing price for the subject home of the sale transaction to at least one value of the subject home of the sale transaction,
    determining an aggregate of the computed ratios, wherein the aggregate of the computed ratios includes a mean of the computed ratios or a median of the computed ratios, and
    for at least one sale transaction of the plurality of sale transactions in the geographic area,
    determining that the ratio computed for the sale transaction is more than a threshold distance from the determined aggregate of the computer ratios, and
    in response to determining that the ratio computed for the sale transaction is more than the threshold distance from the determined aggregate of the computed ratios, discarding the sale transaction from the plurality of sale transactions;
  retrieving an automatically determined estimate of a value of a first home in the geographic area;
  estimating, using the trained model, for the first home in the geographic area, a number of days from listing to sale based upon (a) the automatically-determined estimate of the value of the first home in the geographic area and (b) sale transactions of the plurality of sale transactions that have not been discarded; and
  providing for display to a first user a graph that includes, for each of a plurality of listing prices for the first home,
    an indication of a sale probability for the first home at the listing price for the first home, and
    an indication of an estimated number of days on market for the first home at the listing price for the first home.

2. The method of claim 1 wherein the result of the home listing transactions is one of sale at some price, relisting, or withdrawal from the real estate market.

3. The method of claim 1 wherein the model incorporates listing price history and cumulative time on market of at least one home that has been listed for sale more than once.

4. The method of claim 1 wherein the model incorporates one or more valuations of at least one home that has been listed for sale.

5. The method of claim 1 wherein the model incorporates data characterizing the real estate market in which at least one home was listed for sale.

6. The method of claim 5 wherein the data characterizing the real estate market in which at least one home was listed for sale indicates average listing prices.

7. The method of claim 5 wherein the data characterizing the real estate market in which at least one home was listed for sale indicates average times from listing to sale.

8. The method of claim 1, wherein:
  the model comprises a random forest regression model comprising decision trees;
  creating the model comprises creating at least one decision tree; and
  training the model, using the values of the attributes and the home listing transactions, comprises, for each of the least one decision tree:
    selecting a subset of the attributes that includes a listing price;
    generating a trained decision tree by training the at least one decision tree using the subset of the attributes, such that each leaf node of the trained decision tree represents a distinct combination of ranges of values of the subset of the attributes and a distinct subset of the homes, each of the first plurality of homes being represented by exactly one leaf; and
    storing, in connection with each leaf node, the estimated length of time from listing to sale based on the home listing transactions of the subset of homes represented by the leaf node.

9. The method of claim 8 wherein storing the estimated length of time from listing to sale in connection with each leaf node comprises storing, for each of the homes represented by the leaf node, the length of time the home was on the real estate market and the result of the home listing transactions.

10. The method of claim 8, further comprising:
  accessing, for each of a second plurality of homes that were listed for sale, the second plurality of homes being distinct from the first plurality of homes, values of attributes for the home including a listing price at which the home was listed for sale, and listing information including the length of time the home was on the real estate market and the result of the home listing transactions; and
  for each trained decision tree:
    for each home:
      identifying a second leaf node representing attribute value ranges containing values of the home's attributes including listing price;
      using the second leaf node to generate a second estimated length of time from listing to sale for the home; and
      comparing the second estimated length of time from listing to sale to the length of time the home was on the real estate market and the result of the home listing transactions to obtain an error measure for the trained decision tree and the home;
    obtaining an overall error measure for the trained decision tree across the second plurality of homes; and
    attributing a relative weight to the decision tree that is inversely related to the overall error measure obtained for the trained decision tree.

11. A computer-readable non-transitory medium having instructions that cause a computer to perform a method for estimating a length of time from listing to sale of a distinguished home, the method comprising:

accessing a plurality of values, each value corresponding to one of a plurality of home attributes for the distinguished home;
accessing one or more trained models, each trained model predicts a length of time from listing to sale of a home in a geographic area based on the plurality of values for the home and a listing price, wherein a trained model is estimates a time from listing to sale, wherein the trained model is trained using listing and sales transaction data describing home listing events associated with homes in the geographic area, and
wherein training the model further comprises:
  collecting a plurality of sale transactions for the geographic area, each of the plurality of sale transactions having a subject home,
  for each of the plurality of sale transactions in the geographic area, computing a ratio of listing price for the subject home of the sale transaction to at least one estimated value of the subject home of the sale transaction,
  determining an aggregate of the computed ratios, wherein the aggregate of the computed ratios includes a mean of the computed ratios or a median of the computed ratios, and
  for at least one sale transaction of the plurality of sale transactions in the geographic area,
    determining that the ratio computed for the sale transaction is more than a threshold distance from the determined aggregate of the computed rations, and
    in response to determining that the ratio computed for the sale transaction is more than the threshold distance from the determined aggregate of the computed ratios, discarding the sale transaction from the plurality of sale transactions; and
retrieving an automatically determined estimate of a value of a first home in the geographic area;
estimating, using the trained model, for the first home in the geographic area, a number of days from listing to sale based upon (a) the automatically-determined estimate of the value of the first home in the geographic area and (b) sale transactions of the plurality of sale transactions that have not been discarded; and
generating a display page that includes an indication of the first home in the geographic area and an indication of the number of days from listing to sale estimated for the first home in the geographic area.

12. The non-transitory computer-readable medium of claim 11, wherein at least one trained model of the one or more trained models comprises a survival analysis model predicts the length of time that at least one home will remain unsold when listed for sale at a listing price in the geographic area.

13. The non-transitory computer-readable medium of claim 11, the method further comprising:
for each of a plurality of listing prices, estimating a length of time from listing to sale of the distinguished home at the listing price of the plurality of listing prices.

14. The non-transitory computer-readable medium of claim 13, the method further comprising:
displaying a set of estimates of the length of time a home will remain unsold on a real estate market at each of the plurality of listing prices.

15. The computer-readable medium of claim 13, the method further comprising:
determining, based on the estimated lengths of time from listing to sale and a listing price, an estimated duration of time within which the distinguished home will be sold.

16. A method in a computer system having a processor, the method comprising:
accessing, for each of a plurality of homes that were listed for sale, values of attributes for the home including a listing price at which the home was listed for sale, and listing information including a length of time the home was on a real estate market and a result of the listing information;
creating a model by the processor;
training the model, using the values of attributes and the listing information, for:
  estimating a likelihood of sale,
  collecting a plurality of sale transactions in a geographic area, each of the plurality of sale transactions having a corresponding home,
  for each of the plurality of sale transactions in the geographic area, computing a ratio of listing price for the home corresponding to the sale transaction to at least one estimated value of the home corresponding to the sale transaction,
  determining an aggregate of the computed ratios, wherein the aggregate of the computed ratios includes a mean of the computed ratios or a median of the computed ratios, and
  for at least one sale transaction of the plurality of sale transactions in the geographic area,
    determining that the ratio computed for the sale transaction is more than a threshold distance from the determined aggregate of the computed ratios, and
    in response to determining that the ratio computed for the sale transaction is more than the threshold distance from the determined aggregate of the computed ratios, discarding the sale transaction from the plurality of sale transactions;
retrieving an automatically determined estimate of a value of a first home in the geographic area;
estimating, using the trained model, for the first home in the geographic area, the likelihood of sale of the first home based upon (a) the automatically-determined estimate of the value of the first home in the geographic area and (b) sale transactions of the plurality of sale transactions that have not been discarded; and
providing, for display to a first user, an indication of the likelihood of sale.

17. The method of claim 16 wherein, fora listing for which sale is pending, the result of the listing information is treated as a sale.

18. The method of claim 16, further comprising:
filtering out, from the plurality of homes that were listed for sale, active listings listed for less than a threshold time period, and listings of distressed homes.

19. The method of claim 16, further comprising filtering out, from the plurality of homes that were listed for sale, listings associated with real estate agents or brokers identified for creating listings with information with errors.

20. A non-transitory computer-readable medium having instructions that cause a computer to perform a method for estimating a likelihood of sale of a distinguished home at a particular listing price, the method comprising:
for each of a plurality of home attributes, accessing a value of the attribute for the distinguished home, accessing one or more trained models, each trained model predicts a likelihood of sale of a home based on the values of attributes for the home and a listing price, the trained model estimates a likelihood of sale for homes,
wherein training the model further comprises:
collecting a plurality of sale transactions, each of the plurality of sale transactions having a corresponding home,
for each of the plurality of sale transactions,
computing a ratio of listing price for the home corresponding to the sale transaction to an estimated value of the home corresponding to the sale transaction,
determining an aggregate of the computed ratios, wherein the aggregate of the computed ratios includes a mean of the computed ratios or a median of the computed ratios, and
for at least one sale transaction of the plurality of sale transactions,
determining that the ratio computed for the sale transaction is more than a threshold distance from the determined aggregate of the computed ratios, and
in response to determining that the ratio computed for the sale transaction is more than the threshold distance from the determined aggregate of the computed ratios,
discarding the sale transaction from the plurality of sale transactions;
retrieving an automatically determined estimate of a value of a first home;
estimating, using the trained model, for the first home, the likelihood of sale of the first home based upon (a) the automatically-determined estimate of the value of the first home and (b) sale transactions of the plurality of sale transactions that have not been discarded; and
generating a display page that includes an indication of the first home and an indication of the likelihood of sale of the first home estimated using the trained model.

21. The non-transitory computer-readable medium of claim 20, wherein at least one trained model of the one or more trained models comprises a parametric model.

22. The non-transitory computer-readable medium of claim 21, wherein the parametric model is a logistic regression model.

23. The non-transitory computer-readable medium of claim 20 wherein the model is predicts whether or not a second home will sell within a defined period of time.

24. The non-transitory computer-readable medium of claim 20, the method further comprising:
estimating the likelihood of sale of the distinguished home at a particular listing price within a specified time period.

25. The non-transitory computer-readable medium of claim 20, the method further comprising:
estimating the likelihood of sale of the distinguished home at multiple listing prices; and
displaying a set of estimates of likelihoods of sale for a second home at each of the multiple listing prices.

26. The non-transitory computer-readable medium of claim 20, the method further comprising:
estimating the likelihood of sale of the distinguished home at multiple listing prices; and
determining, based on the estimated likelihoods of sale at the multiple listing prices and a listing price, an estimated probability that the distinguished home will be sold.

27. The method of claim 1, wherein the values of the attributes for the home include at least two imputed values, wherein the at least two imputed values include a value imputed using a median value among a set of values for a continuous variable and a mode value among a set of values for a categorical value.

28. The method of claim 16, further comprising:
filtering out, from the plurality of homes that were listed for sale, listings associated with real estate agents or brokers identified for creating listings priced outside a predetermined tolerance of median listing prices.

29. The method of claim 1, wherein the trained model comprises a K-nearest neighbor model.

30. The method of claim 1, further comprising:
selecting, from among the plurality of sale transactions that have not been discarded, a number of sale transactions that is between a first threshold and a second threshold.

31. The method of claim 30, wherein the second threshold is at least four times the first threshold.

32. The method of claim 1, further comprising:
discarding sale transactions from the plurality of sale transactions whose computed ratios identify them as outliers having a top five percent of ratios and a bottom five percent of ratios.

* * * * *